(12) United States Patent
Echeruo

(10) Patent No.: US 7,957,871 B1
(45) Date of Patent: Jun. 7, 2011

(54) METHODS AND APPARATUSES FOR NAVIGATION IN URBAN ENVIRONMENTS

(75) Inventor: Chinedu Echeruo, New York, NY (US)

(73) Assignee: Hopstop.com, Inc., New York, NY (US)

( * ) Notice: Subject to any disclaimer, the term of this patent is extended or adjusted under 35 U.S.C. 154(b) by 853 days.

(21) Appl. No.: 11/238,224

(22) Filed: Sep. 29, 2005

(51) Int. Cl.
*G01C 21/34* (2006.01)

(52) U.S. Cl. ............ 701/54; 701/201; 709/223; 104/27; 340/995.13; 340/995.27

(58) Field of Classification Search ............... 701/54, 701/201; 709/223; 104/27, 28, 88.01; 105/215.2; 340/995.13, 995.27; G01C 21/34
See application file for complete search history.

(56) References Cited

U.S. PATENT DOCUMENTS

| | | | | |
|---|---|---|---|---|
| 4,800,502 | A * | 1/1989 | Stewart et al. | 705/417 |
| 5,214,689 | A | 5/1993 | O'Sullivan | |
| 5,237,931 | A * | 8/1993 | Riedl | 104/28 |
| 5,537,324 | A * | 7/1996 | Nimura et al. | 701/208 |
| 5,797,330 | A * | 8/1998 | Li | 104/28 |
| 6,119,065 | A * | 9/2000 | Shimada et al. | 701/201 |
| 6,282,489 | B1 | 8/2001 | Bellesfield et al. | |
| 6,374,182 | B2 * | 4/2002 | Bechtolsheim et al. | 701/209 |
| 6,587,780 | B2 | 7/2003 | Trovato | |
| 6,782,831 | B2 * | 8/2004 | Yamada | 104/53 |
| 6,834,229 | B2 | 12/2004 | Rafiah et al. | |
| 6,871,137 | B2 | 3/2005 | Scaer et al. | |
| 6,901,330 | B1 | 5/2005 | Krull et al. | |
| 7,460,953 | B2 * | 12/2008 | Herbst et al. | 701/211 |
| 2004/0088392 | A1 * | 5/2004 | Barrett et al. | 709/223 |
| 2004/0158395 | A1 * | 8/2004 | Yamada et al. | 701/202 |
| 2004/0204825 | A1 * | 10/2004 | Maruyama et al. | 701/200 |
| 2005/0038596 | A1 * | 2/2005 | Yang et al. | 701/200 |
| 2005/0225457 | A1 * | 10/2005 | Kagawa | 340/995.13 |
| 2006/0031003 | A1 * | 2/2006 | Sun et al. | 701/117 |

FOREIGN PATENT DOCUMENTS

JP  2005241386 A * 9/2005

* cited by examiner

*Primary Examiner* — Tuan C To
(74) *Attorney, Agent, or Firm* — Fernandez & Associates, LLP

(57) ABSTRACT

Embodiments disclose methods, systems, and apparatuses for providing maps and directions, including walking and mass transit directions in urban environments where users do not drive cars. Additionally, driving directions can be included. Various criteria, including preferences for amount of walking, for or against particular streets, certain mass transit vehicle types, number of transfers between mass transit vehicles, and other preferences, are considered in the routing calculations, as well as non-individual information such as current conditions and other information. User feedback on various qualitative aspects of the directions is received and stored, and used in subsequent routing decisions. Embodiments disclosed include web services whereby third parties, such as members of the travel industry, can access such services which provide textual and graphical information. Further, clients can access and edit mass transit information through the web services.

23 Claims, 20 Drawing Sheets

**Ground layer
of graph**

Add Route | Approve All Routes
1 2 3 4 5 6 7 8 9 10 11 12 13 Next Page >>

| # | Id | Name | Start | End | Day/Time/Frequency | Vehicle Name | Vehicle Type | Approved | Modified | User | Action |
|---|---|---|---|---|---|---|---|---|---|---|---|
| ☐ 1 | 435 | 1 Train Broadway 7th Av Local | Uptown | Downtown | all/all/10 | 1 | Subway Train | Y | | admin | Edit Show |
| ☐ 2 | 436 | 1 Train Broadway 7th Av Local | Downtown | Uptown | all/all/10 | 1 | Subway Train | Y | | admin | Edit Show |
| ☐ 3 | 25 | 2 Train 7th Av Express | Uptown | Downtown | all/all/10 | 2 | Subway Train | Y | | admin | Edit Show |
| ☐ 4 | 26 | 2 Train 7th Av Express | Downtown | Uptown | all/all/10 | 2 | Subway Train | Y | | admin | Edit Show |
| ☐ 5 | 28 | 3 Train 7th Av Express | Downtown | Uptown | all/6:30 AM - 12:00 AM/11 | 3 | Subway Train | Y | | admin | Edit Show |
| ☐ 6 | 39 | 3 Train 7th Av Express | Uptown | Downtown | all/6:30 AM - 12:00 AM/11 | 3 | Subway Train | Y | | admin | Edit Show |
| ☐ 7 | 288 | 4 Train Lexington Av Express | Uptown | Downtown | all/all/10 | 4 | Subway Train | Y | | admin | Edit Show |
| ☐ 8 | 289 | 4 Train Lexington Av Express | Downtown | Uptown | all/all/10 | 4 | Subway Train | Y | | admin | Edit Show |
| ☐ 9 | 137 | 42 Street Shuttle | to Times Square | to Grand Central | all/6:30 AM - 12:00 AM/8 | S | Subway Train | Y | | admin | Edit Show |

City: New York Change

Stops | Routes | Transfers | Vehicle Types | Change Password | Logout
Users | Clients | Members | Edit Walking Features | Finx XY | ReBuild Crawl | Stats | Banners | Edit Help | YP | Text Msg Sub Add Stop | Approve All Stops | Update XY of Stops | Update XY of Secondary Exits | Delete Unused Stops
1 2 3 4 5 6 7 8 9 10 11 12 13 14 15 16 17 18 19 20 21 22 23 24 25 26 27 28 29 30 31 32 33 34 35 36
60 61 62 63 64 65 66 67 68 69 70 71 72 73 74 75 76 77 78 79 80 81 82 83 84 85 86 87 88 89 90 91 92 ...
112 113 114 115 116 117 118 119 120 121 122 123 124 125 126 127 128 129 130 131 132 133 134 135 136 ...

| # | Id | Name | Address | Borough | X | Y | Approved | Modified | User | Action |
|---|---|---|---|---|---|---|---|---|---|---|
| ☐ 1 | 138 | 1 Av | East 86th St & 1st Ave | Manhattan | -73.949461 | 40.776994 | Y | | admin | Edit |
| ☐ 2 | 189 | 1 Av | East 96th St & 1st Ave | Manhattan | -73.944723 | 40.783269 | Y | | admin | Edit |
| ☐ 3 | 204 | 1 Av | East 116th St & 1st Ave | Manhattan | -73.935417 | 40.796083 | Y | | admin | Edit |
| ☐ 4 | 396 | 1 Av | East 79th St & 1st Ave | Manhattan | -73.952996 | 40.772476 | Y | | admin | Edit |
| ☐ 5 | 276 | 1 Av/124th | East 124th St & 1st Ave | Manhattan | -73.931702 | 40.801126 | Y | | admin | Edit |
| ☐ 6 | 9930 | 1 Av/23 St | East 23rd St & 1st Ave | Manhattan | -73.97881 | 40.737183 | Y | | prudent5 | Edit |
| ☐ 7 | 6888 | 1 Av/23 St | East 23rd St & 1st Ave | Manhattan | -73.97881 | 40.737183 | Y | | Prudent4 | Edit |
| ☐ 8 | 9029 | 1 Av/58 St | 1 Av & 58 St | Brooklyn | -74.023835 | 40.645728 | Y | | Prudent2 | Edit |
| ☐ 9 | 791 | 1 Av/60 st | East 60th St & 1st Ave | Manhattan | -73.961684 | 40.760499 | Y | | admin | Edit |
| ☐ 10 | 683 | 1 Av/67 st | East 67th St & 1st Ave | Manhattan | -73.958476 | 40.76482 | Y | | admin | Edit |
| ☐ 11 | 680 | 1 Av/68th | East 68th St & 1st Ave | Manhattan | -73.958018 | 40.765461 | Y | | admin | Edit |
| ☐ 12 | 464 | 1 Av/71 st | East 71st St & 1st Ave | Manhattan | -73.956686 | 40.767301 | Y | | admin | Edit |
| ☐ 13 | 465 | 1 Av/72 st | East 72nd St & 1st Ave | Manhattan | -73.956162 | 40.767991 | Y | | admin | Edit |
| ☐ 14 | 142 | 1 Av/91st | East 91st St & 1st Ave | Manhattan | -73.947081 | 40.780164 | Y | | admin | Edit |
| ☐ 15 | 197 | 1 av/97th | East 97th St & 1st Ave | Manhattan | -73.944264 | 40.783926 | Y | | admin | Edit |

Fig. 10

HOOPSTOP
YOUR CITY TRANSIT GUIDE

Online Subway and Bus directions  New York City  Boston (Beta)  Washington, DC (Beta)

*get the card that gives you more nyc*

A Enter start address  B Enter destination address

Language: English | Transportation mode: Subway + Bus | Walking/Transfer Preference: Less street walking/More transfers | Departure time: Wednesday 12:30AM Get Subway directions remotely on your cell phone or PDA! Click here.

City Guide: Attractions  Bars & Clubs  Beauty & Body  Hospitals  Hotels  Museums  Restaurants  Shopping

A 450 W 15th St, Manhattan
B E 46th St and Park Ave, Manhattan

| Suggested Route | Roundtrip | Add More Destinations | Time |
|---|---|---|---|
| 🚶 | Start out going East on West 15th St towards West 16th St | | 1.7 |
| M14 | Take the M14A Crosstown bus from 15th St/9 Av station heading East | | 7.5 |
| Rate | | | |
| | Pass 14th St/9 Av | | 2.1 |
| | Pass 14th St/8 Av | | 2.4 |
| | Get off at 14th St/7 Av | | 2.4 |
| | Entrance near intersection of West 14th St and 7th Ave | | 2.0 |
| 2 | Take the 2 train from 14 Street station heading Uptown | | 5.0 |
| Rate | | | |
| | Pass 34 Street - Penn Station | | 3.1 |
| | Get off at 42 Street - Times Square | | 1.7 |
| | Transfer | | |
| 7 | Take the 7 train from 42 St - Times Square station heading to Queens | | 5.0 |
| Rate | | | |
| | Pass 5 Avenue | | 1.6 |
| | Get off at 42 Street - Grand Central | | 1.5 |
| | Exit near intersection of East 42nd St and Lexington Ave | | 2.0 |
| 🚶 | Start out going North on Lexington Ave towards East 43rd St | | 5.1 |
| | Turn left onto East 46th St | | 2.6 |
| | Total travel | 1.81 miles | 45 mins |

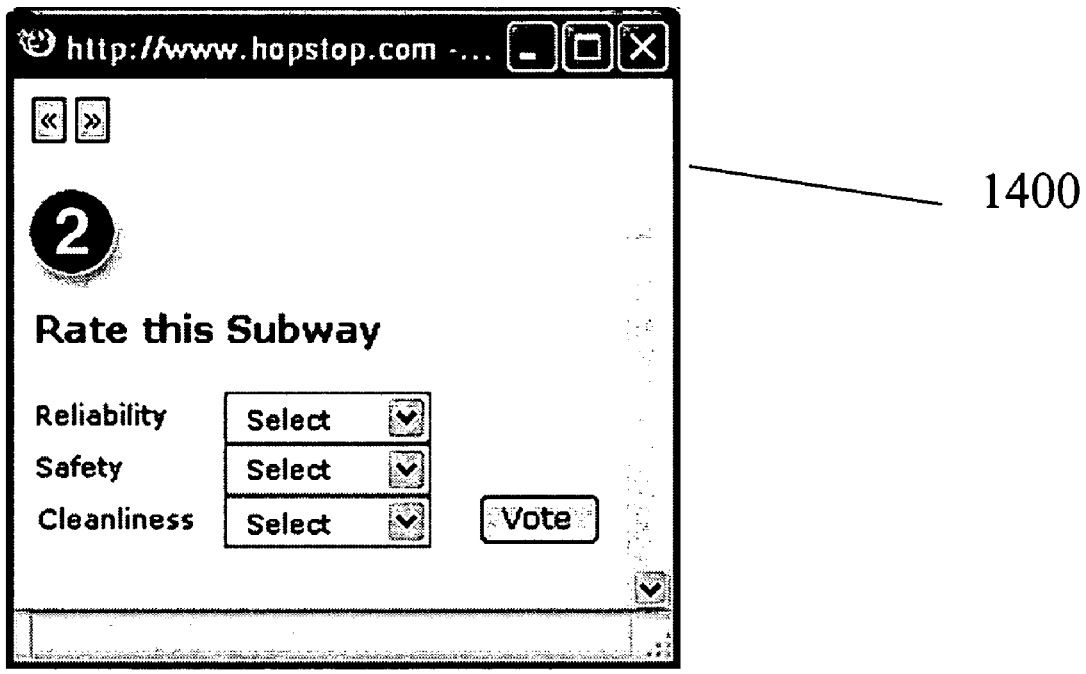
1400
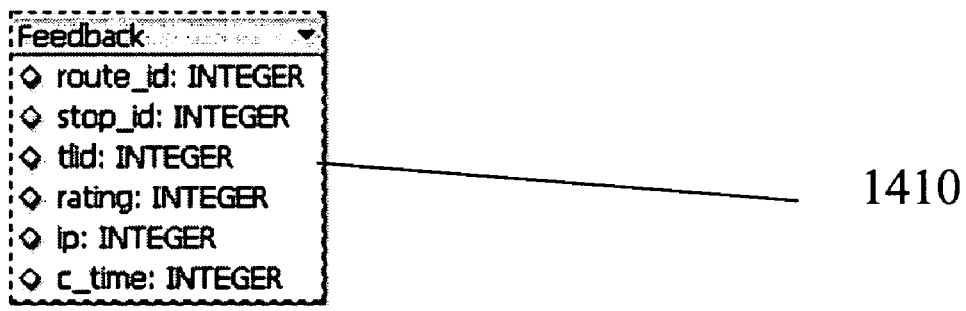
1410
*Figure 15*
Fig. 14

METHODS AND APPARATUSES FOR NAVIGATION IN URBAN ENVIRONMENTS

BACKGROUND

Field of the Invention

The invention relates to automated assistance in finding maps and routes in urban areas, often without an automobile, involving walking, mass transit, and other transportation modes.

SUMMARY

The invention provides methods and apparatuses for assisting users in journey planning within urban areas, especially without the use of an automobile. A fully integrated system of walking, mass transit, and driving directions is provided, taking into account time of day and day of week; user preferences for amount of walking, number of mass transit transfers, and other factors; current congestion data; and user feedback on qualitative and quantitative measures of transportation, such as best subway lines, average walk times on particular streets, or most scenic streets.

BRIEF DESCRIPTION OF THE DRAWINGS

FIG. 10 is a diagram with two screen shots of the mass transit database service.

FIG. 12 is a diagram with a screen shot of the user interface of one embodiment of the invention.

FIG. 14 is a diagram with a screen shot illustrating aspects of the system for incorporating feedback from users, in one embodiment of the invention.

DETAILED DESCRIPTION

Figure 1:
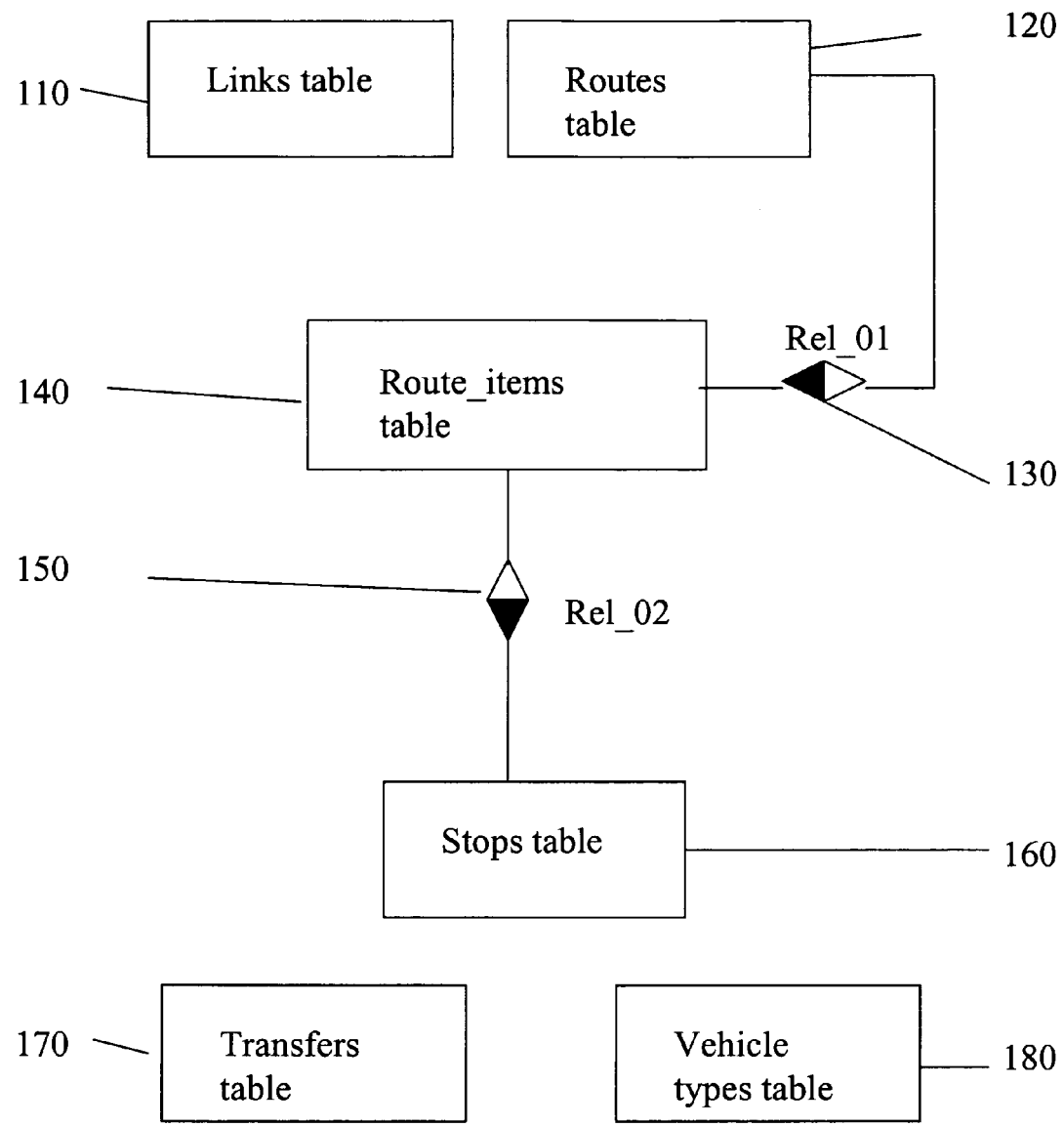
FIG. 1 is a diagram illustrating a database used in one embodiment of the invention.

HTTP (for HyperText Transfer Protocol) is the primary method used to convey information on the World Wide Web.

A Uniform Resource Locator, URL or Web address, is a standardized address for some resource (such as a document or image) on the Internet or elsewhere. First created by Tim Berners-Lee for use on the World Wide Web, the currently used forms are detailed by Internet standard RFC 1738.

An HTTP cookie (usually called simply a cookie) is a packet of information sent by a server to a World Wide Web browser and then sent back by the browser each time it accesses that server. Cookies are used by a server to maintain state between otherwise stateless HTTP transactions, and are often used for authentication, personalization, shopping baskets, and other information about the user accessing the server.

XML is a standard general purpose markup language, recommended by the World-Wide Web Consortium (W3C). Its primary purpose is to facilitate the sharing of data across different systems, particularly systems connected via the Internet. Languages based on XML (for example, RDF, RSS, MathML, XHTML, SVG, and cXML) are defined in a formal way, allowing programs to modify and validate documents in these languages without prior knowledge of their form.

An XML document is a particular computer document in the XML format.

The term "XML schema", when used here, is broadly understood to mean a description of a type of XML document, typically expressed in terms of constraints on the structure and content of documents of that type, above and beyond the basic constraints imposed by XML itself. It can include a DTD (Document Type Definition), an XML Schema, a RELAX NG schema, or other definition of an XML document type.

The term "server", when used here, is broadly understood to mean any computing entity or family of such entities capable of responding to user requests over a network. The computing entities may be computer servers or server farms, general purpose digital computers, personal digital assistants, special-purpose devices such as printers or scanners with digital processors built in, or specialized hardware devices such as XML chips or XML computers; either containing storage units or making use of storage units elsewhere on the network. The family of computing entities may be geographically distributed or may be "virtual" entities within a larger entity.

The term "database", when used here, is broadly understood to mean a collection of one or more data elements stored in one or more computers. The database may be structured in a variety of ways, such as in flat files, in a relational model, hierarchical model, network model, dimensional model, object-oriented model, or in any sort of information retrieval structure known in the art. The database may be distributed across one or more servers. Various sorts of indexing schemes may be applied to the database in order to optimize access times for the data. The database may support read-write access or it may be read-only.

The term "user interface control", when used here, is broadly understood to mean any suitable hardware or software permitting a human being to provide input to a computer.

Hardware devices include joysticks, styluses, mice or other pointing devices, keyboards, touch screens, keypads, microphones and other computer peripherals already existing or yet to be invented. Software includes typed commands, hyperlinks, graphical user interface controls such as menus, buttons, choice lists, check boxes, radio buttons, and the like, already existing or yet to be invented. Software user interface controls can be provided via a command-line interface, graphical user interface, Web-based interface, gestural interface, tactile interface, voice interface, SMS (Short Text Message), or other.

The term "web service", when used here, is broadly understood to mean a software system designed to support interoperable machine-to-machine interaction between software processes, which may be separated by a network. A web service has an interface described in a machine-processable format, which may be XML or any format built on XML, such as WSDL (Web Service Description Language). Web services may be accessed over any common network protocol, such as HTTP, FTP, SMTP, XMPP, or other protocols. The format of a web service message may be defined by SOAP, XML-RPC, JAX_RPC, REST, remote procedure call, distributed object method frameworks such as CORBA or DCOM, or other computer format such as Common Gateway Interface, comma-separated value, tab-separated value, Basic Encoding Rules, or other format. A web service may be published in a UDDI (Universal Description, Discovery, and Integration) format, which provides information assisting potential users of the web service to find and use the service.

The term "validating" when used here in the context of a web service, is broadly understood to mean performing a step on license information submitted by a client which authenticates the client, verifies that the client is entitled to access the web service and that the terms of the contractual arrangement have not been violated and that the license has not expired, verifies that the license information has not been duplicated contrary to terms of the license, and rejects the request if any of the above tests fail. Validation may be carried out by any method known in the art, such as one-way hash functions, shared secrets, public key encryption, or other methods, including no encryption (clear text).

The term "mass transit vehicle", when used here, is broadly understood to mean a conveyance which transports persons who do not own the conveyance, whether for free or for payment. It can include a conveyance of any publicly or privately operated organization, including buses, subways, trains, bicycles, motorcycles, trolleys, light rail, trams, ferries, monorails, taxicabs, pedicabs whether operated by foot power or motor power, Segways, airplanes, horse-drawn carriages, helicopters, car services, automobiles, or other forms of transportation existing or yet to be invented.

The term "mass transit route", when used here, is broadly understood to mean an identification of a particular mass transit service or route. It may be a train number for a train or subway service, a flight number for an airline, a bus number for a bus service, or a ferry number for a ferry service. It is to be distinguished from a vehicle number, i.e. the identification of a particular mass transit vehicle.

The term "mass transit stop", when used here, is broadly understood to mean a particular place where a mass transit vehicle traveling a mass transit route may stop to take on and let off passengers, whether regularly scheduled or on passenger demand. It can include a bus stop, subway or tram stop, ferry entrance or exit, cab stand, train station, airport, heliport, or any similar location.

The term "mass transit direction", when used here, is broadly understood to mean an instruction to board a mass transit vehicle traveling a particular mass transit route at a particular mass transit stop, and to depart the vehicle at another mass transit stop.

The term "mass transit transfer direction", when used here, is broadly understood to mean an instruction to exit a mass transit vehicle traveling a particular mass transit route at a particular mass transit stop, and board a second mass transit vehicle traveling a second mass transit route at a particular mass transit stop, The term "mass transit criteria" when used here, is broadly understood to mean any factor which may be meaningful to a user regarding mass transit directions. It can include any of the factors enumerated in "mass transit conditions", as well as personal preferences, e.g. desire to minimize cash outlay, a distaste for large crowds, slow trains or crowded buses, a favorite bus driver, or a route which one's friends or coworkers habitally take. It can also include a vehicle preference for buses only, subways only, or buses plus subways, or a maximum number of transfers in a route. It can also include any preference for or against particular mass transit routes, e.g. in favor of those routes going through attractive areas or against those tending to be crime-ridden or slow, or any transit route where the user has any good or bad experiences in the past.

The term "vehicle time wastage", when used here, is broadly understood to mean time spent by a mass transit vehicle when the vehicle is not moving. It can include time waiting in traffic, at a bus stop, subway stop, ferry stop, or any other form of delay, whether predictable or unpredictable. In cases of unpredictable delay, an expected average value may be used.

The term "walking direction", when used here, is broadly understood to mean an instruction to walk along one or more streets in specified directions, starting at a first point and finishing at a second point, and turning at specified points.

The term "current information" when used here, is broadly understood to mean information that is frequently updated. The frequency of update may vary according to unique characteristics of the information, and may be monthly, weekly, daily, hourly, or even more frequently.

The term "mass transit conditions", when used here, is broadly understood to mean current information on conditions affecting mass transit usage in a particular area. It can include information on strikes and other work stoppages; breakdowns of mass transit vehicles; crimes; problems with mass transit infrastructure such as subway stations, electrical systems, control systems, ferry facilities such as docks, water routes, or bus stations; overloaded mass transit routes such as might be encountered before or after a sporting event or other public event; or any factor affecting the desirability or efficacy of using a particular mass transit route.

The term "walking conditions", when used here, is broadly understood to mean current information on conditions affecting walking in a particular area. It can include information on construction sites, demonstrations, parades, street closures, riots, sporting events, conventions, concerts, outdoor theater events, public events such as a visit by a government official or other public figure, movie or television shooting, recent crimes, suicides, traffic accidents, terrorist incidents, police or military operations, natural disasters, or any factor affecting the desirability or efficacy of walking in a particular area.

The term "walking criteria", when used here, is broadly understood to mean any factor which may be meaningful to a user regarding walking directions. It can include any of the factors enumerated in "walking conditions", as well as such personal preferences related to these, e.g. a distaste for large crowds. It can also include any preference for or against particular streets or areas, such as favorite stores or restaurants, areas where the user has friends or relatives, or is employed, has clients or customers, or has any good or bad experiences in the past.

The term "geographic database", when used here, is broadly understood to mean a database storing geographic, topographic, cartographic, spatial, mass transit information, walking information, or street and road information, or any combination thereof. It may have been derived from survey data, including census data; from governmental or private institutions; satellite data; aerial photography; manual entry from printed mass transit schedules; map scanning; or other source of input.

The term "publisher", when used here, is broadly understood to mean an entity, public or private, owning rights to a geographic database or route-finding service and offering it for free, or for sale or distribution via a network.

The term "contractual arrangement", when used here, is broadly understood to mean an action performed between at least two parties, one of whom is an entity acting on behalf of a publisher, and another of whom is an entity acting on behalf of a user wishing to gain access to such information. The contractual arrangement could include payment via cash, check, credit card, PayPal or other such payment services, presentation of a coupon or other promotional offer, agreement to perform reciprocal services, or any means whereby the client meets the access requirements of the publisher, including simply agreeing to terms of a license.

Automated navigation systems are known in the art. Bellesfield et al (U.S. Pat. No. 6,282,489), for instance, discloses methods and apparatus for displaying a travel route and generating a list of places of interest located near the travel route. Rafiah et al (U.S. Pat. No. 6,834,229) discloses a journey planner providing an integrated travel plan involving multiple transportation modes including driving and public transportation. Many other systems providing road directions, e.g. Mapquest on the Internet, are available.

Such systems are commonly limited to providing road directions, which may be useful for either driving or walking. Rafiah, mentioned above, accesses the online databases of various transport providers, e.g. trains, buses, ferries, airlines, subways, and others, creating a menu of options for longer trips, such as city to city, but ignores many of the problems of urban travel, as will be shown below.

1. Data on mass transit authorities are frequently not online and typically cannot be accessed electronically by third parties. Subways and bus routes and maps are usually presented to the public in printed maps and schedules and sometimes made available online in unstructured formats.
2. There is no standard or data schema for describing transit data from the hundreds of transit authorities in the United States. The lack of a standard data schema across the transit authority data sets means that algorithms to calculate the optimal route for a user cannot be applied consistently across cities and transit authorities.
3. Transit authorities do not currently allow electronic access to their data sets by third parties.
4. Previous systems may rely on official mass transit schedules and timetables which are often inaccurate. The previous systems also do not incorporate the "local" knowledge of commuters who walk down the local streets, use subway and bus stations, and mass transit routes on a daily basis. Incorporating the feedback and ratings of these users into the algorithms and calculations of mass transit vehicles, stops and streets system is a novel approach and dramatically improves the value of information provided to the user.

Finally, there are many GPS-enabled devices which can assist in finding a route over terrain with or without roads. However, the micro-environment of an urban area presents additional and hitherto unaddressed problems.

In an urban environment, users are presented with a different set of issues than have been addressed by such navigation systems.

1. Consumers need a graphic representation of their walking path. A textual description of walking directions is of little utility to the consumer, given the uncertainty of their current location and their end location.
2. On some navigation systems, subway and bus entrances locations are represented on a map but the optimal path to reach these entrances is not calculated. These calculation are crucial given the existence of un-walkable streets such as highways. The best path to the subway or bus entrance may itself be the most challenging step for the consumer.
3. Subway entrances and exits are sometimes time specific. A subway entrance may be available during the weekdays but may be closed on weekends. Walking directions need to take this information into account.
4. Sometimes a journey may require driving directions to a train, mass transit directions to a bus, and then walking directions to the end location. The calculation of such a route is only possible with the seamless integration of several data sources.

In New York, for example, people frequently do not own cars, or at least do not drive them for daily use, since it is costly, slow, and inconvenient, and parking is scarce and expensive. Public transportation, particularly buses, subways, and ferries, on the other hand, is readily available and routes are well-integrated, so that a substantial number of Manhattan residents do not even own a car.

Yet there is a vast amount of knowledge about the various bus and subway lines which residents and visitors must master in order to use the system efficiently. For example, the NYC Transit system has 468 subway stations. The 25 subway routes are interconnected, and many lines feature express trains, across-the-platform transfers to local trains and "skip-stop" express service. Moreover, certain trains operate on different frequencies and stop on different subway stations based on the time of day and day of the week. Often newcomers, tourists, and other visitors simply walk or use taxis because they don't know where the buses and subways run, or how often, where to board them, how to pay for them (whether exact change is required, stored-value fare cards, etc.) or where to exit. The uncertainty is simply too great for someone unfamiliar with the system.

Moreover, walking is a vitally important transportation option in Manhattan and other urban areas. Not only is it sometimes the most efficient method for short distances, it is often preferable because of the exercise benefits, access to shopping and other urban services, enjoyment of pleasant weather, etc. Yet walking can also be problematic, especially for newcomers but even for natives. In cities comprised of a large network of streets, city residents and tourists are often confused by the complex maze of connecting street walkways. Some of these streets are also only available to vehicles or are un-passable on foot. In addition, consumers require clear walking directions to the appropriate location to enter a subway station or bus stop. There is a need for point-to-point routing information including walking direction, in addition to other transportation options.

An end-to-end journey an automobile in Manhattan, Boston, Washington, or other city with well-developed rapid transit thus requires assembling information from a diverse set of sources, not as yet well-integrated or Web-enabled. There is thus a need in the art for systems and methods for assisting navigation in an urban environment, especially without a car.

The invention provides a range of services related to navigation in urban areas. Routes from a start point to an end point and optionally passing through one or more intermediate points can be created, taking into account user criteria. Current information, such as mass transit conditions and walking conditions, as defined earlier in this document, can be factored into the routing decisions. Users can access the services from standard computers, hand-held digital devices such as PDAs, including via SMS (short message service) messages, voice recognition interface, or via a Web Service or ordinary HTTP access.

In one embodiment, a user enters a start and destination address into a web page, preferences for amount of walking, transportation mode (subways, buses, walking, or combinations thereof), tolerance for transfers among mass transit vehicles; maximum number of buses taken (users may not want to take 3 successive buses, even if it is the "optimal" route by some calculations), max number of subway trains, date and time of departure, etc. In other embodiments, users can provide feedback indicating preferences for or against certain streets for walking (because of shopping desirability, or crime undesirability), or against certain mass transit routes (e.g. because of past mechanical problem, chronic lateness, crowded cars, etc.). Feedback can be used either for individual routing decisions, or, in one embodiment, as current information on mass transit conditions, walking conditions, or driving conditions which influences routing decisions for one or more other users as well. In still other embodiments, routing can be conditioned based on time of day or day of week (certain streets may be deserted at night and thus dangerous), or on the weather (walking is less preferable when it's raining), or based on special events (a visit by the President may upset all transit schedules in the immediate neighborhood).

In embodiments of the invention, users provide feedback which is used to continuously enhance the quality of the invention. Feedback is used both to create and maintain a database about the user's own preferences, which is useful for creating routes for that user; and also to update the database used for all users. For example, a user may report a preference for walking on a particular street because she has friends there, and may also report that a subway stop has broken turnstiles and is dirty and unpleasant. The former information is used only in the context of creating a route for that user, while the latter is applicable to all users.

In addition to adjusting the database based on reported times, conditions, and preferences, the invention, in another embodiment, acts as a "social network" or "virtual community".

User comments, in some cases, contain more detail than can be captured in a rating system or in average speed data. Therefore, comments are also made available in an unmediated, searchable format Additionally, a Web Service is provided for transit operators and other third parties in order that mass transit information can be viewed, entered, and edited, saving the operators the burden of hosting and maintaining a web presence. The route information can be accessed from an Internet-enabled computer, via text messaging services such as SMS (short message service) on a mobile computing device such as PDA or cell-phone, or by voice over a normal cell phone. A Web Service is provided for programmatic use, as well as a standard HTTP server for human-mediated use.

FIG. 1 illustrates the table structure used in a database in one embodiment of the invention.

The Links table 110 is a table of transportation links: walking, rapid transit, etc. For each link, such information as the id, (x,y) coordinates of the start and stop points, the distance, the name of the link, start and stop ids, vehicle-id, and other information is stored. Its source for walking links can be a publicly available geographical database, such as TIGER/Line data from the U.S. Census Bureau, or a commercial digital map provider such as Navteq (www.navteq.com) or Tele Atlas (www.teleatlas.com) or others. Its source for rapid transit links is the Routes table 120.

The Routes table 120 is a table of rapid transit routes. There is no single, universal source of online rapid transit information in some cities, and an aspect of the invention is a method of creating and providing such a source. The Routes table 120 contains an id, name, description, vehicle type, schedule information on when the route is traversed, information on when the data was entered and by whom it was approved, etc.

The Stops table 160 is a table of rapid transit stops, containing for each stop its id, address, (x,y) coordinates, name, description, information on when the data was entered and by whom it was approved, etc.

The Route_items table 140 is a relational table providing a correspondence between 140 and 160, symbolized by the "Rel_01" 150 symbol. There is one row for each stop of each route, the row containing the id of the route and the id of the stop.

The Transfers table 170 is a table of transfer information.

The Vehicle_types table 180 is a table of vehicle types.

Figure 2:
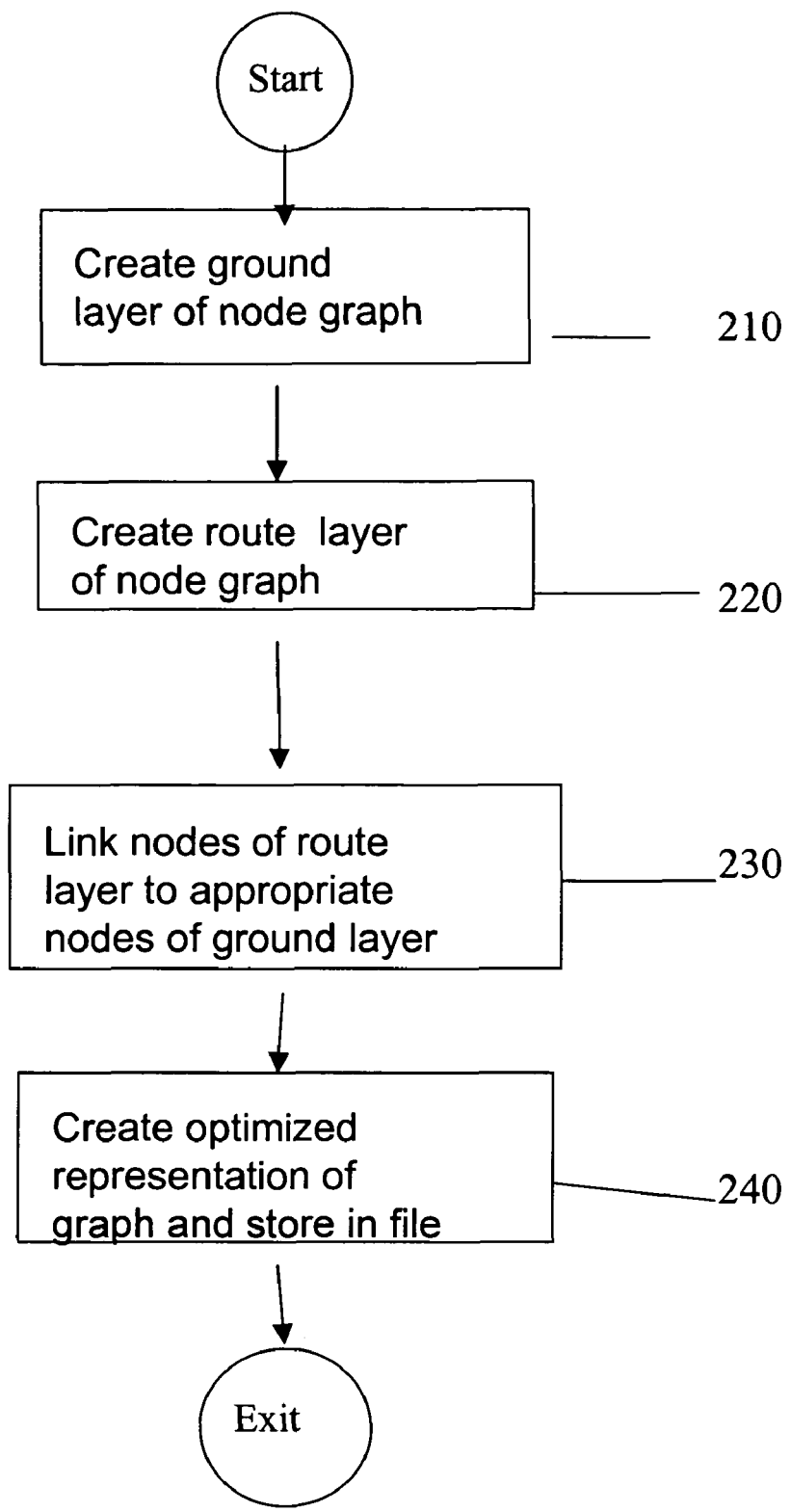
FIG. 2 is a diagram illustrating creation of the node graph, a key data structure of the routing algorithm.

FIG. 2 illustrates overall flow of the "administrative" steps of the invention, the construction of the directed graph which is the basis of the route-finding algorithm. At step 210, the "ground layer" of the graph is created, i.e. the layer which contains facts about streets and other ground features, without reference to mass transit. At 220, the "route layer" of the graph is created, i.e. the layer containing information about mass transit, walking, and other routes. At 230, the nodes of the route layer are linked to their appropriate nodes in the ground layer. At 240, the graph is stored in a format which is optimized for future use in route-finding.

Figure 3:
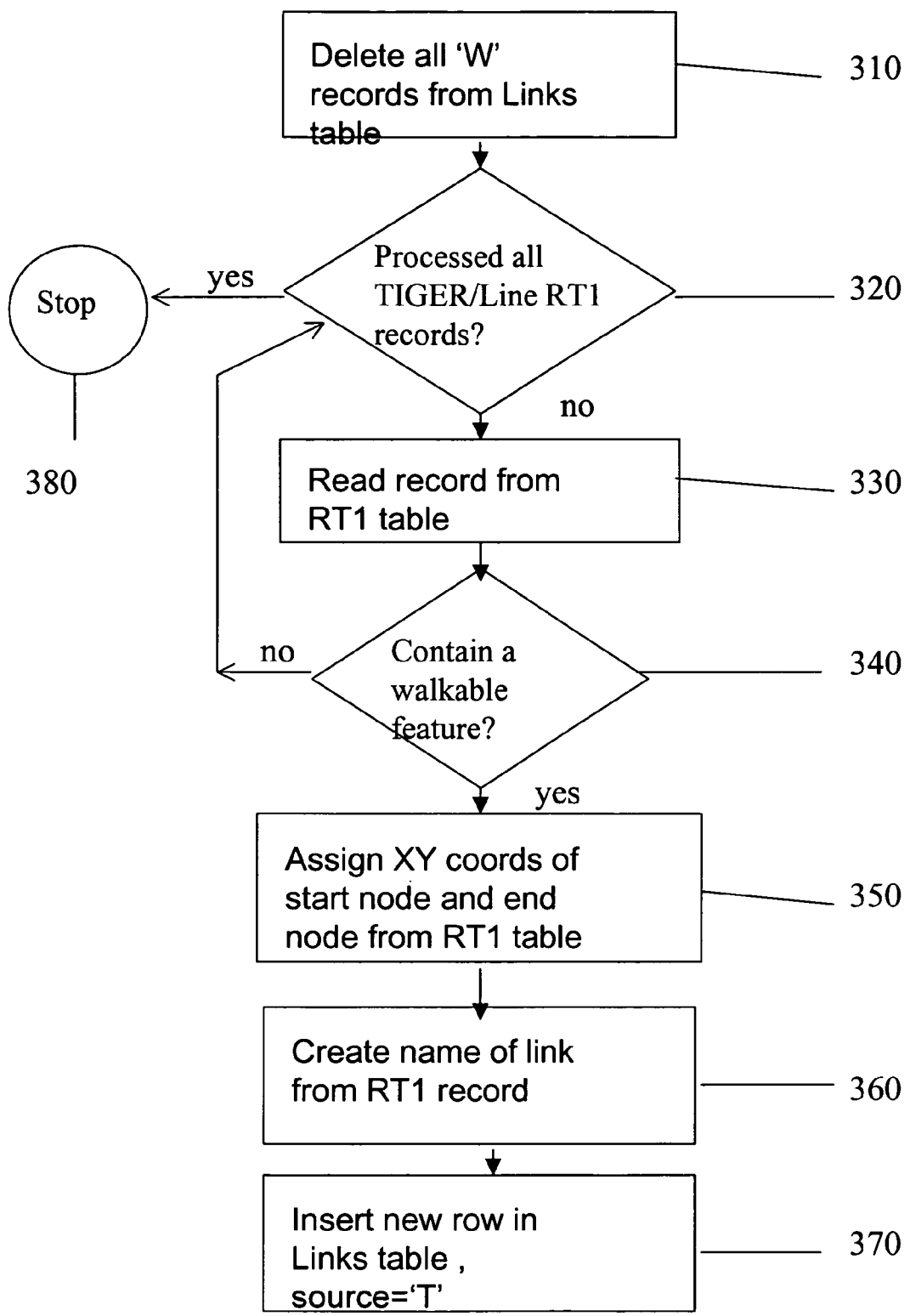
FIG. 3 is a diagram illustrating the processing of TIGER/Line data from the U.S. Census Bureau, a step in the creation of the node graph.

FIG. 3 illustrates more detail of the administrative steps of FIG. 2. A geographical database is read, in one embodiment the TIGER/Line data from the U.S. Census Bureau, specifically the RT1 dataset for the relevant geographical entity served by the invention. At 310 all 'W' (for 'walking') records are deleted from the Links Table. At 320 a test is made as to whether all records from the TIGER/Line data have been read. If so, the algorithm stops 380. If not, a record is read from the database at 330. At 340 a test is made as to whether the record' contains a walkable feature. (Certain streets are only accessible to cars, e.g. expressways or other limited-access roads. Such streets are not made part of a walking direction.) If not, the algorithm returns to 320. If the record does contain a walkable feature, the step 350 is taken, wherein a new Links record is created. The (x,y) coordinates of the record are used to create a start node and end node in the routing graph (detailed below) and saved in the new Links record. A name is also assigned to the link at 360, preferably using a name from the RT1 record. The new Links record is inserted into the Links table at 370, with a 'source' column of 'T' to denote that its source is the TIGER/Line data. The 'source' column may also be 'H' to denote that its source is "HopStop", in one embodiment, the publisher operating the invention.

The Routes table 120 is created "by hand" in one embodiment of the invention, meaning that the data is inputted by administrative personnel of the publisher operating the invention, or by personnel of the various rapid transit agencies, as described later under
Mass Transit Database Service.

Figure 4:
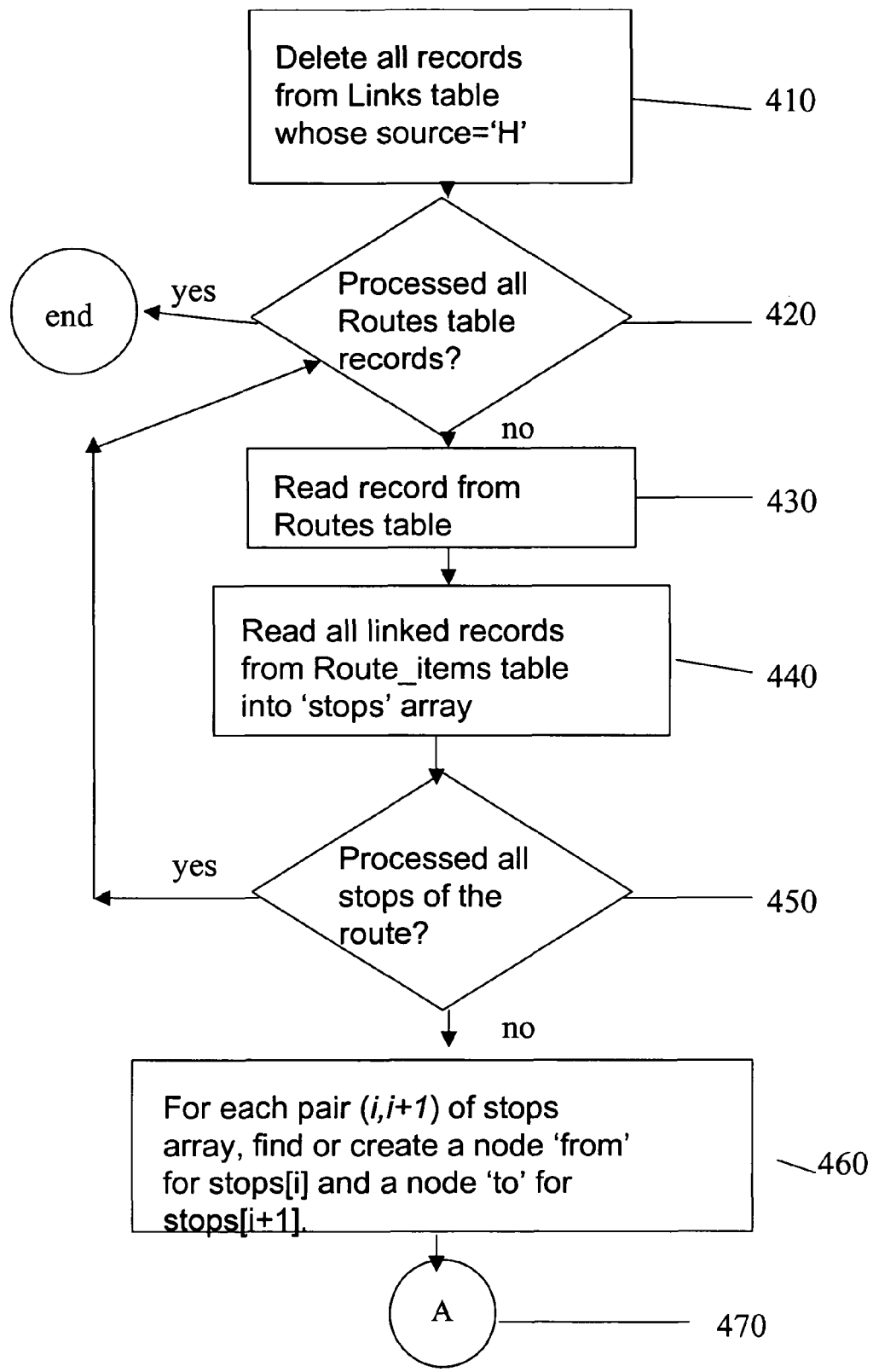
FIG. 4 is a diagram illustrating the processing of the Route datafile, a step in the creation of the node graph.

FIG. 4 illustrates more detail of the administrative steps of FIG. 2, using the Routes table 120. At 410 all records of the Links table whose source is 'H' for HopStop are deleted. At 420 a test is made as to whether all Routes table records have been read; if yes, the algorithm exits. If no, a record is read from the Routes table. The id of the route is used to lookup in the Route_items table, finding all stops with the selected route-id and loading them into the 'stops' array.

Figure 4A:
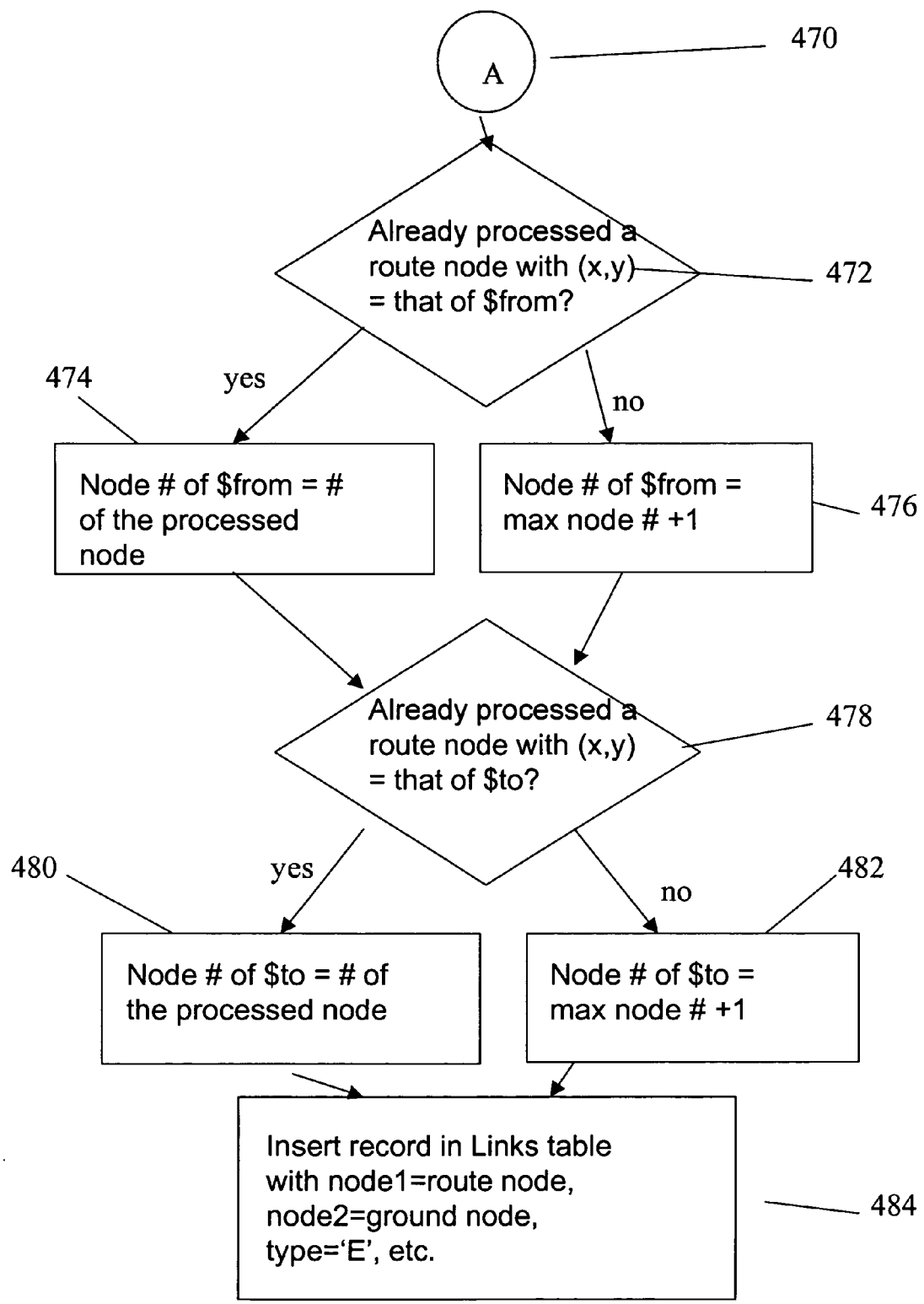
FIG. 4a is a diagram illustrating continuation of the processing of the Route datafile.

At 460, for each pair (i, i+1) of the 'stops' array, a node in the route layer of the directed graph with the same (x,y) coordinates is looked up, and if not found, created. The algorithm continues on FIG. 4a. At 472 a test is made as to whether the algorithm has already processed a route node whose (x.y) coordinates are the same as those of the 'from' node. If so, at 474 the 'from' node is assigned the node number of that node; if not, at 476 a new node number is assigned it. A similar test is made for the 'to' node at 478, where if a route node has been processed whose (x.y) coordinates are the same as those of the 'to' node; if so 480 assigns that node number to the 'to' node; if not, at 482 a new node number is assigned. At 484 a new record is inserted into the Links table.

Figure 5:
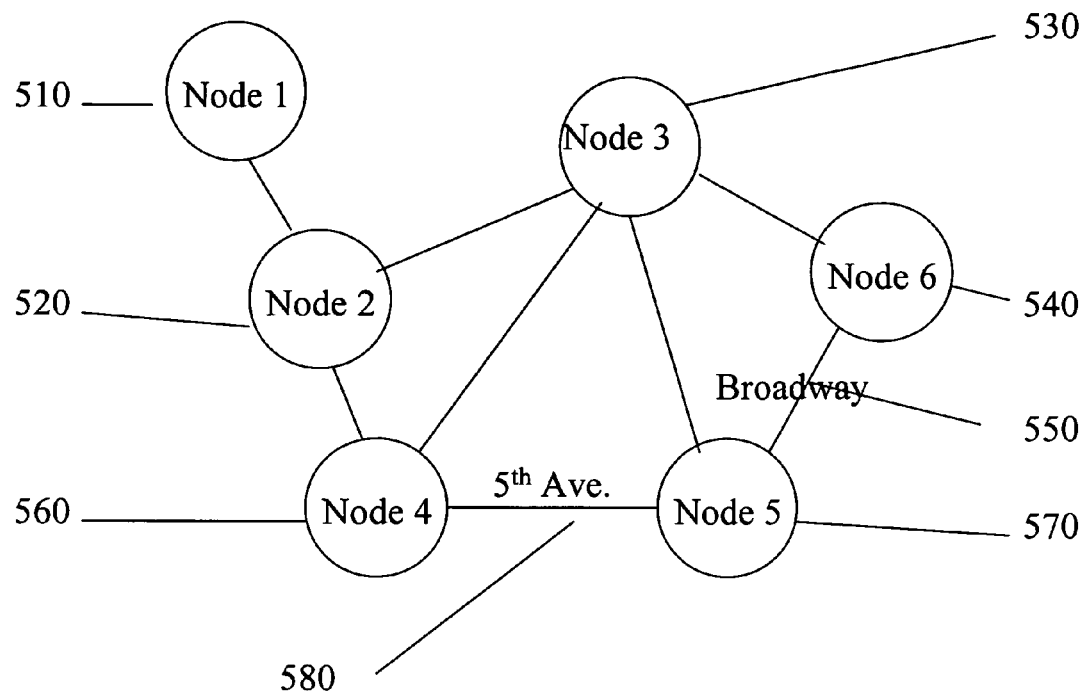
FIG. 5 is a diagram illustrating a segment of the ground layer of the node graph.

FIG. 5 illustrates a hypothetical portion of the ground layer. Node 1 at 510 is linked to Node 2 at 520, which is also linked to Node 3 at 530 and Node 4 at 560. Node 4 also is linked to Node 3 at 530, and also to Node 5 at 570. The lines between nodes are called "edges" in graph theory, and one such edge 580 is labelled "5$^{th}$ Ave." Continuing, Node 3 at 530 is linked to Node 5 at 570 and Node 6 at 540. Node 6 at 540 is linked to Node 5 at 570 via the edge 550 labelled "Broadway." The ground layer of the node graph in FIG. 5 contains nodes for virtually all significant points in the urban area or environment served by the invention.

Figure 6:
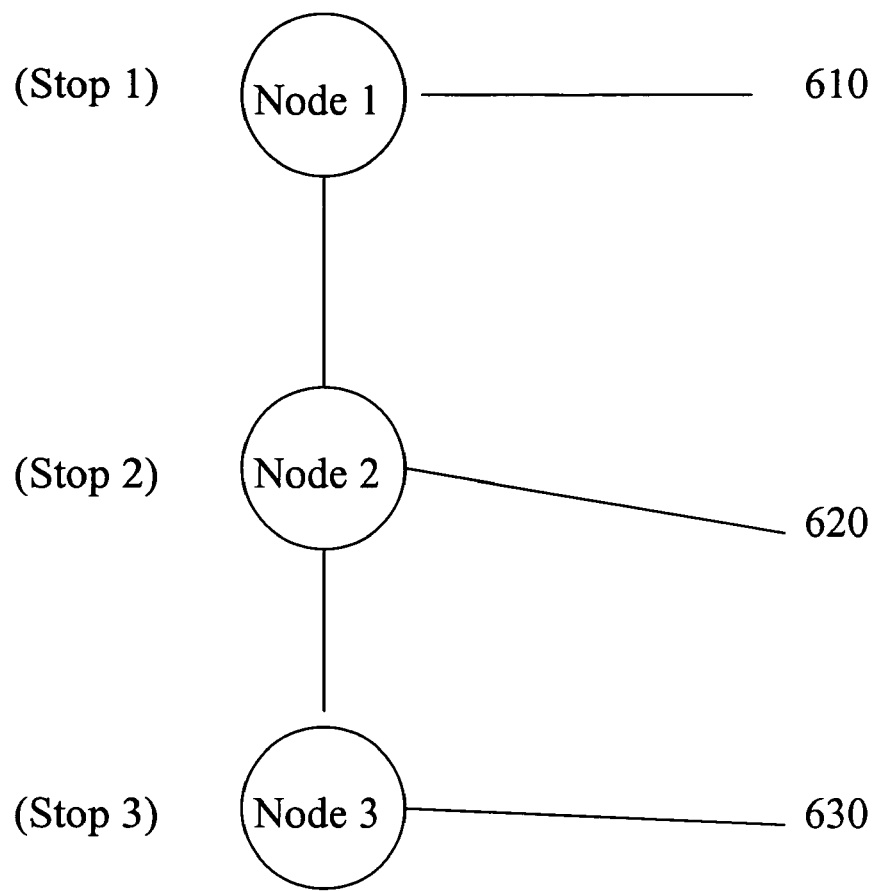
FIG. 6 is a diagram illustrating a segment of the route layer of the node graph.

FIG. 6 illustrates a hypothetical portion of the route layer of the graph. Node 1 (Stop 1) at 610 is a stop on a rapid transit route, which also coincides with 510 of the ground layer. Node 2 (Stop 2) at 620 similarly is a stop and corresponds with 520 of the ground layer, and Node 3 (stop 3) at 630 is a stop and corresponds with 530 of the ground layer.

Figure 7:
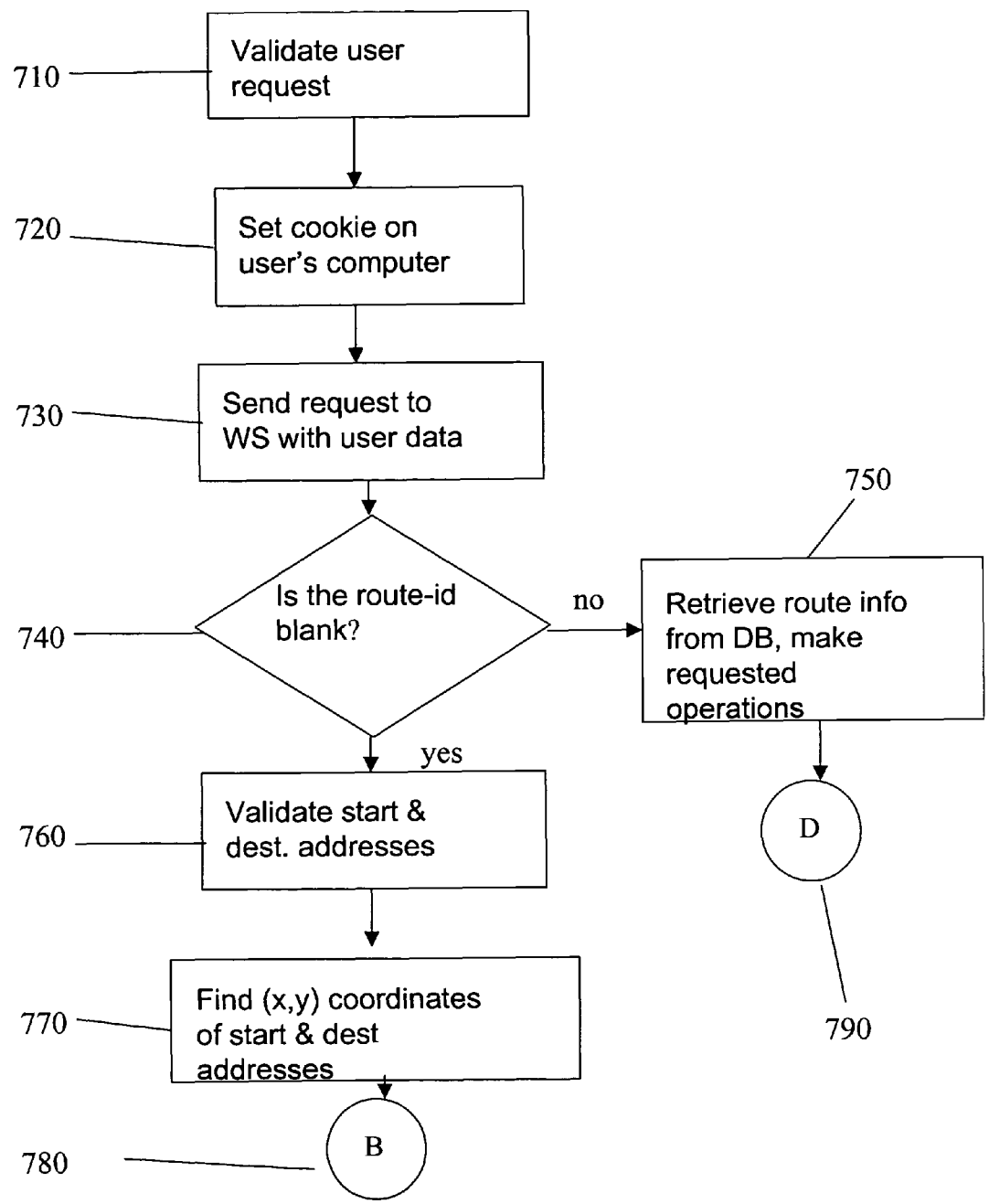
FIG. 7 is a diagram illustrating the start of the processing of a user request for route services.

FIG. 7 illustrates the steps followed by the invention in processing a user request for directions. At 710, the user request is validated by a Web Services client, which may, according to the earlier definition of validation, involve checking that a valid license for party who has entered into a contractual arrangement with the publisher is presented. The Web Services client interacts directly with HTTP and thus the user's browser, and an error is returned if the license or the request is not valid. At 720, an HTTP "cookie" is set on the user's computer, containing the start and end address and other data to enable a "previously used address" to be displayed if the user subsequently uses the service again. At 730, a request is sent to a Web Service. Note that the request sent at 730 could also be sent by an independent Web Services client, such as might be employed by a third-party using the systems of the invention to provide a different or differently-branded service than that offered directly over the Web, e.g. by HopStop.

740 takes place at the aforementioned Web Service. It checks whether a route-id has been supplied with the request or not; a route-id can be passed back and forth to a client to enable a continuing dialog about a route without the route having to be looked up each time. For example, the user might be requesting a different amount of walking, fewer transfers, or other corrections. If the route-id is blank, the route must be looked up from the source and destination addresses, a process beginning at 760. If the route-id is not blank, at 750 the route information is retrieved from the database, using the route-id., and the requested corrections made. At 790, the request continues on a FIG. 8.

At 760, the start and destination addresses are validated. At 770, the (x,y) coordinates of the start and destination addresses are looked up, using any suitable software for resolving a building or intersection address; in one embodiment a publicly available sofware package "Geocoder" (described at http://www.cpan.org/modules/by-module/Geo/Geo-Coder-US-1.00.readme), and spell checker software for checking the spelling of geographic names and offering corrections, such as that offered by Aspell (http://aspell.net). 780 is continued at FIG. 8.

Figure 8:
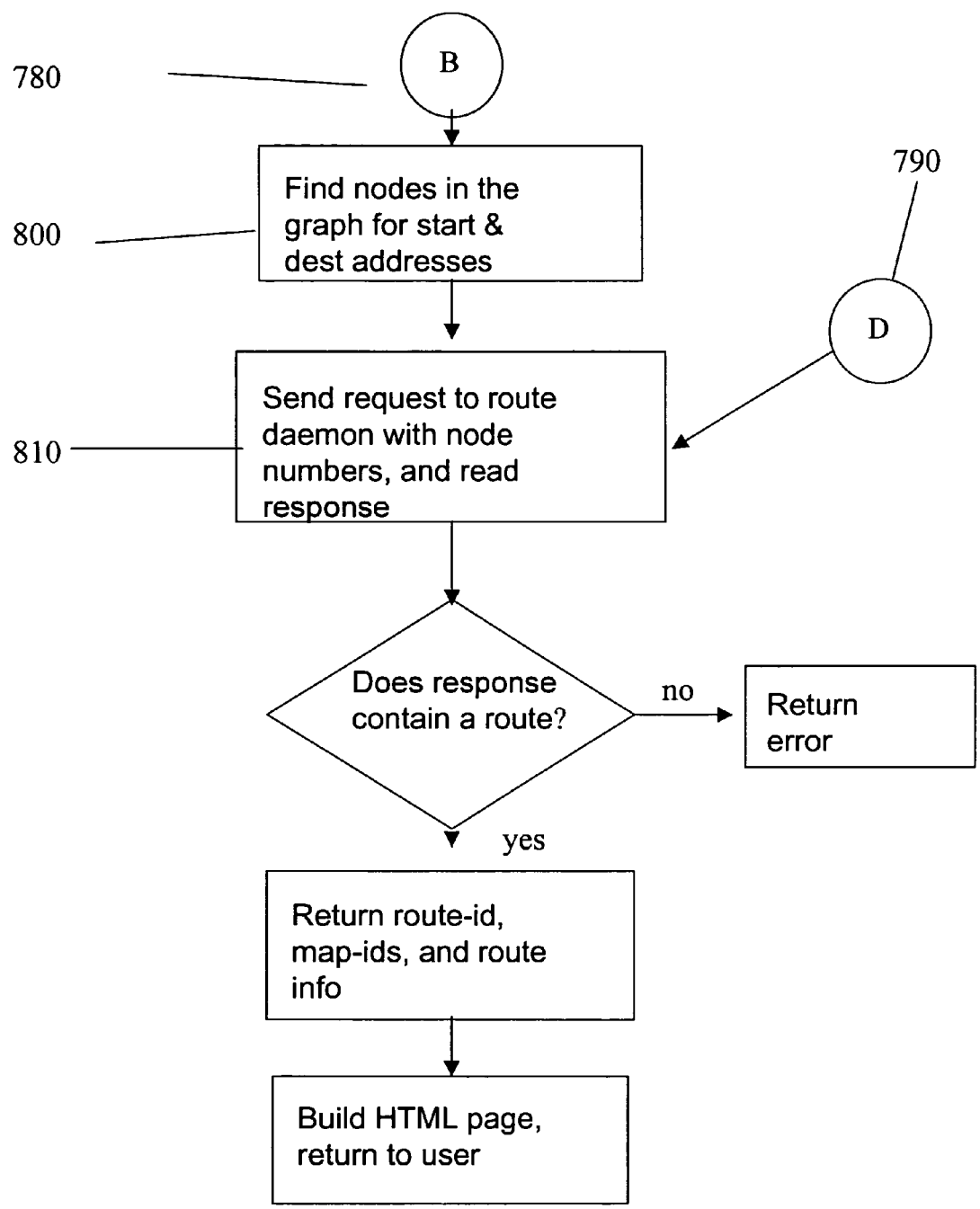
FIG. 8 continues the processing of a user request for route services.

FIG. 8 illustrates the continuation of the Web Services algorithm. At 800 the start and destination addresses are looked up in the directed graph, and node numbers found for start and destination addresses. If node numbers are not found, an error is returned. At 810 a request to the "route daemon", a process or thread running independently which serves potentially many Web Services processes or threads. The route daemon then finds a route using any suitable algorithm for route-finding. In one embodiment, Dijkstra's algorithm, a well-known algorithm which solves the shortest path problem for a directed graph with nonnegative edge weights can be used. Dijkstra's algorithm is not explained in detail here since it is well-known in the art. Other implementations are possible; for example, the Best-First-Search or A* algorithms could also be used, or any suitable route-finding algorithm.

Figure 9:
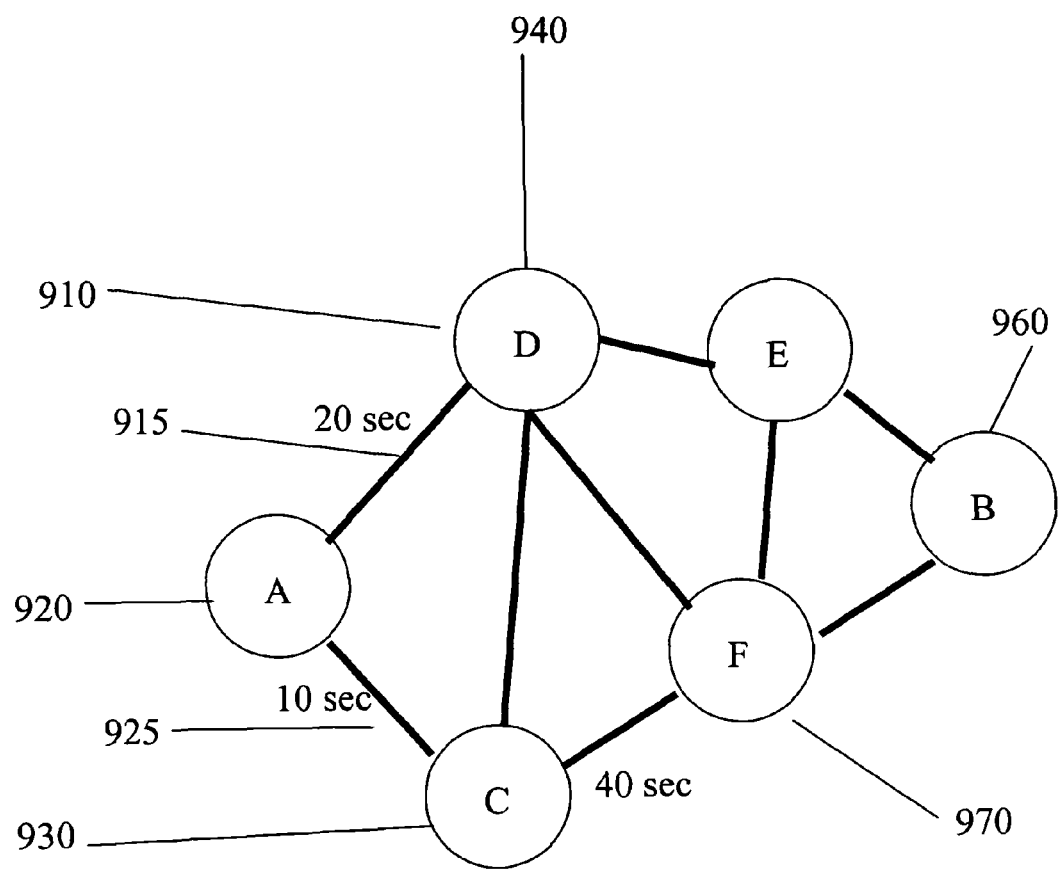
FIG. 9 is a diagram illustrating one simplified route-finding problem.

Although classical route-finding algorithms, such as Dijkstra's, find the least cost route, based on some cost factor, the algorithm has been extended in novel ways for the invention. FIG. 9 illustrates, where the hypothetical task is to find the least cost route from A at 920 to B at 960.

According to Dijkstra's algorithm, nodes are found closest to the start node (node A at 920), one by one. First, consider nodes C at 930 and D at 940. The closest to A is node C, because the distance of edge (link) A-C at 925 is 10 seconds, and A-D at 915 is 20 seconds. Thus the first closest node is found—node A at 920. This is called a "resolved" node. Then, consider nodes that are connected with one edge to the resolved nodes. Compare distances from node A at 920 to such nodes. Thus, compare distances from A at 920 to D at 940 (the distance along edge 915 is 20 seconds), and from A at 920 to F at 970 (the distance is 50 seconds (10+40)). Thus, the second closest node is node D at 940. Repeat finding the next closest node, until node B at 960 is reached (the destination node). Going back, from B to A, using the closest nodes, we find the shortest path from A to B.

Each edge of the graph is a record in the Links table. When the next closest node is searched for and an edge (a link) is considered, the link is "filtered" in the following manner:

If the link is a part of a route, and the vehicle of the route is excluded by the user based on any mass transit criteria (e.g. the user has excluded all buses, or B25 bus only), the link is skipped, as if it doesn't exist in the graph at all.

If the path to the last closest node contains the maximum number of buses taken, according to another mass transit criteria, and the link belongs to a bus route, the link is skipped. The same applies to the mass transit criteria of maximum number of subway trains.

If the walking distance of the path to the last closest node is equal or greater than a walking criteria of maximum distance walked, and the link is a walking link, the link is skipped.

If the link is not available currently because of known mass transit conditions, where "currently" is approximately the departure time selected by the user plus the distance to the last closest node, in seconds), the link is skipped.

It will be apparent to one of ordinary skill in the art that the "filtering" of links can be extended to include any of the criteria mentioned earlier, such as mass transit or walking conditions, user preferences, etc., or other criteria. Additionally, the cost factors shown in FIG. 9 could be adjusted on a continuous basis, so that expected mass transit or walking delays are real-time or nearly so.

FIG. 12 illustrates the user interface of one embodiment of the invention. 1200 points to user interface controls where the user enters the source and destination addresses. In this case, previously-used source address 450 W. 15$^{th}$ St, Manhattan and previously-used destination address E 46h St. and Park Ave, Manhattan are input. 1210 illustrates the textual descriptions of the walking and mass transit directions. 1220 points to a hyperlink titled "Rate", which permits user feedback on this bus line, and brings up the user interface control 1400 on FIG. 14.

Figure 13:
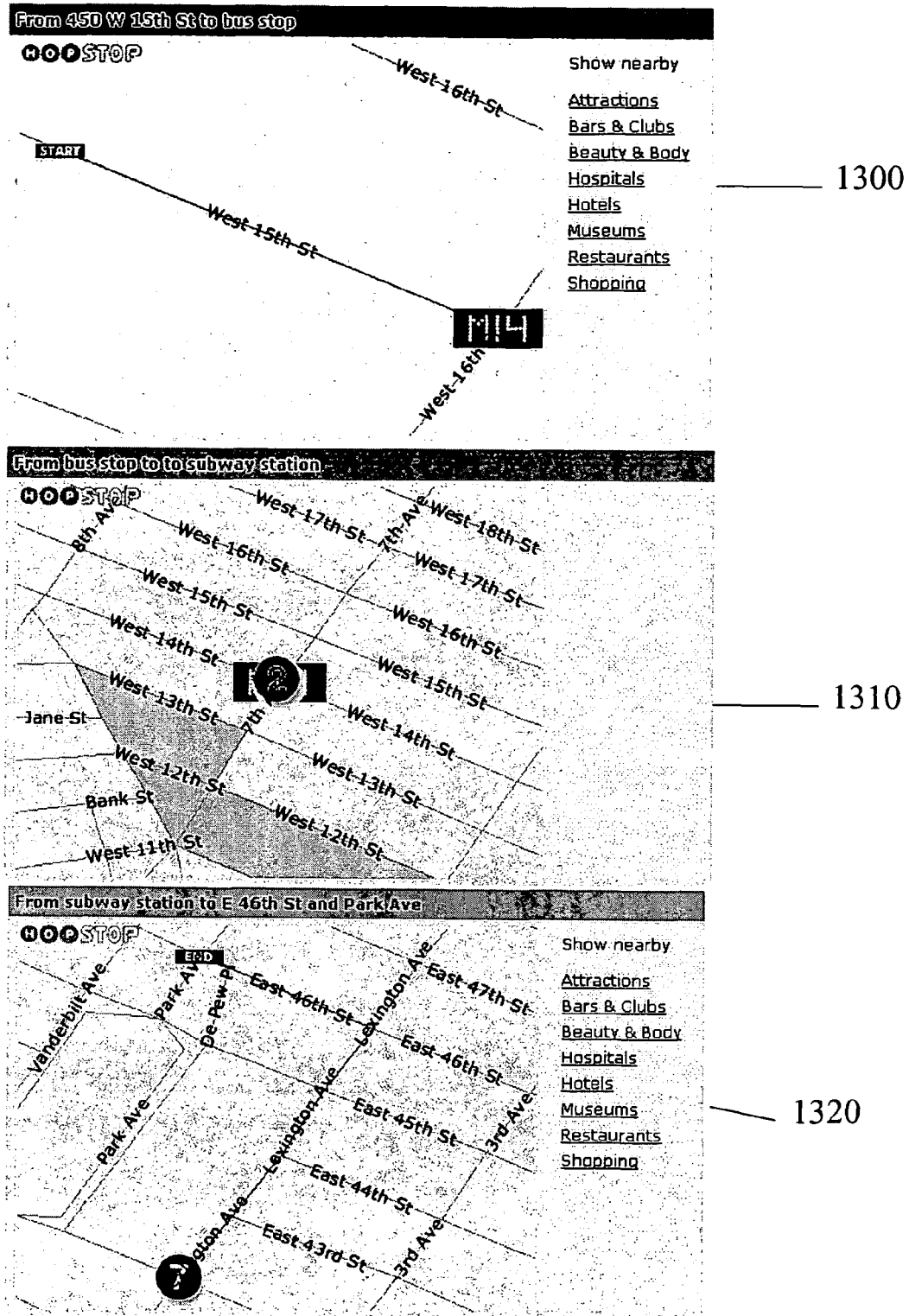
FIG. 13 is a diagram with screen shots of the route information returned by one embodiment of the invention.

FIG. 13 illustrates the graphical depictions of the directions, in one embodiment of the invention. 1300, 1310, and 1320 illustrate different phases of the route.

While thus far embodiments of the invention have been described as for non-driving transportation in urban environments, in other embodiments it can include driving as one or more legs of a trip. For example, a route can include driving to a train station or Park And Ride, parking, taking one or more trains or other mass transit vehicles, and then walking to the final destination. Or, in other embodiments, inter-city trips can be handled, and the route can include driving to an airport, dropping off a rental car, flying to another city, and taking public transportation from the airport, as in cities such as New York, Boston, San Francisco, and Chicago where subway trains serve the airports.

Figure 15:
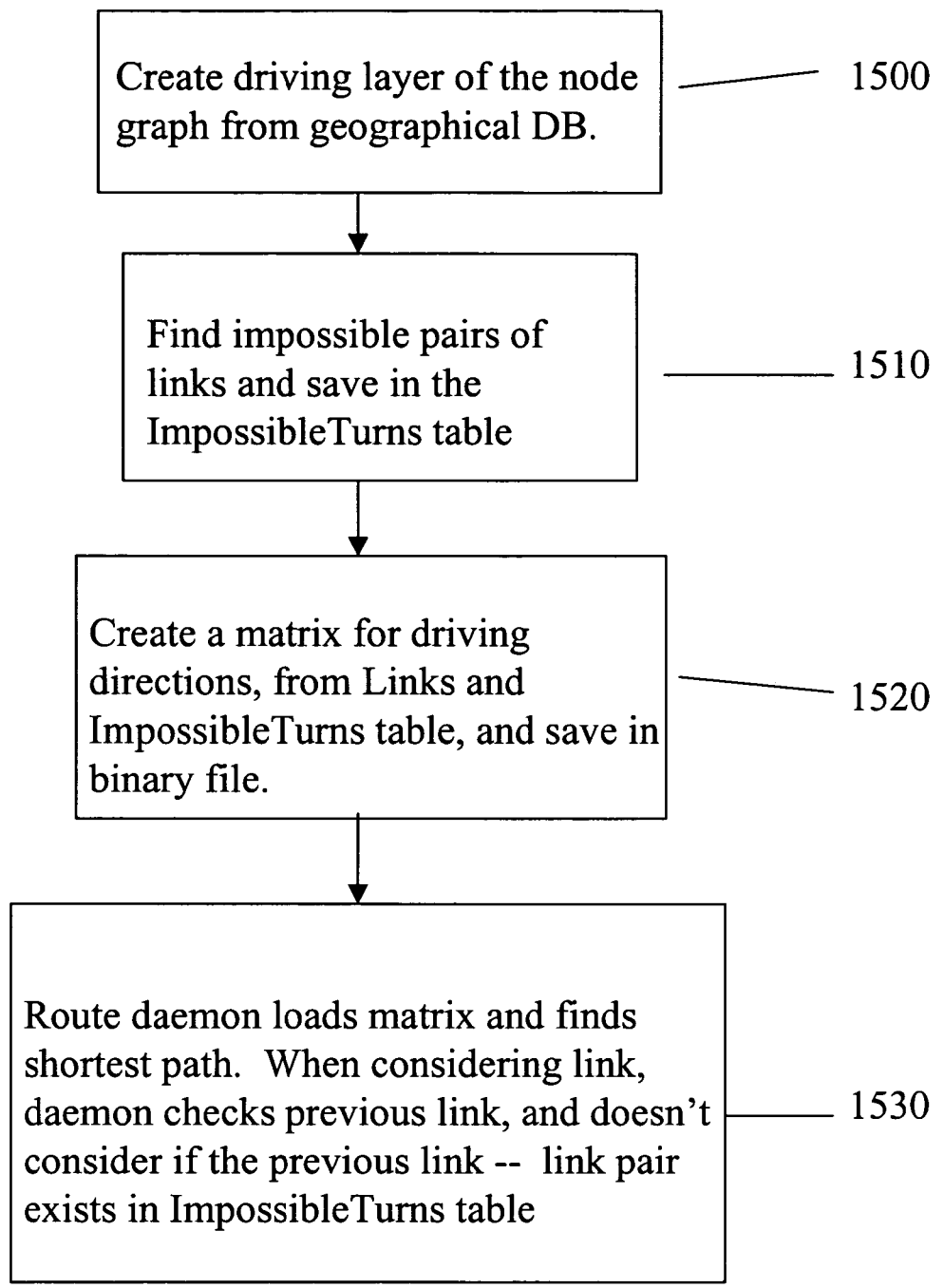
FIG. 15 is a diagram illustrating an overview of the algorithm for providing driving directions.
Figure 16:
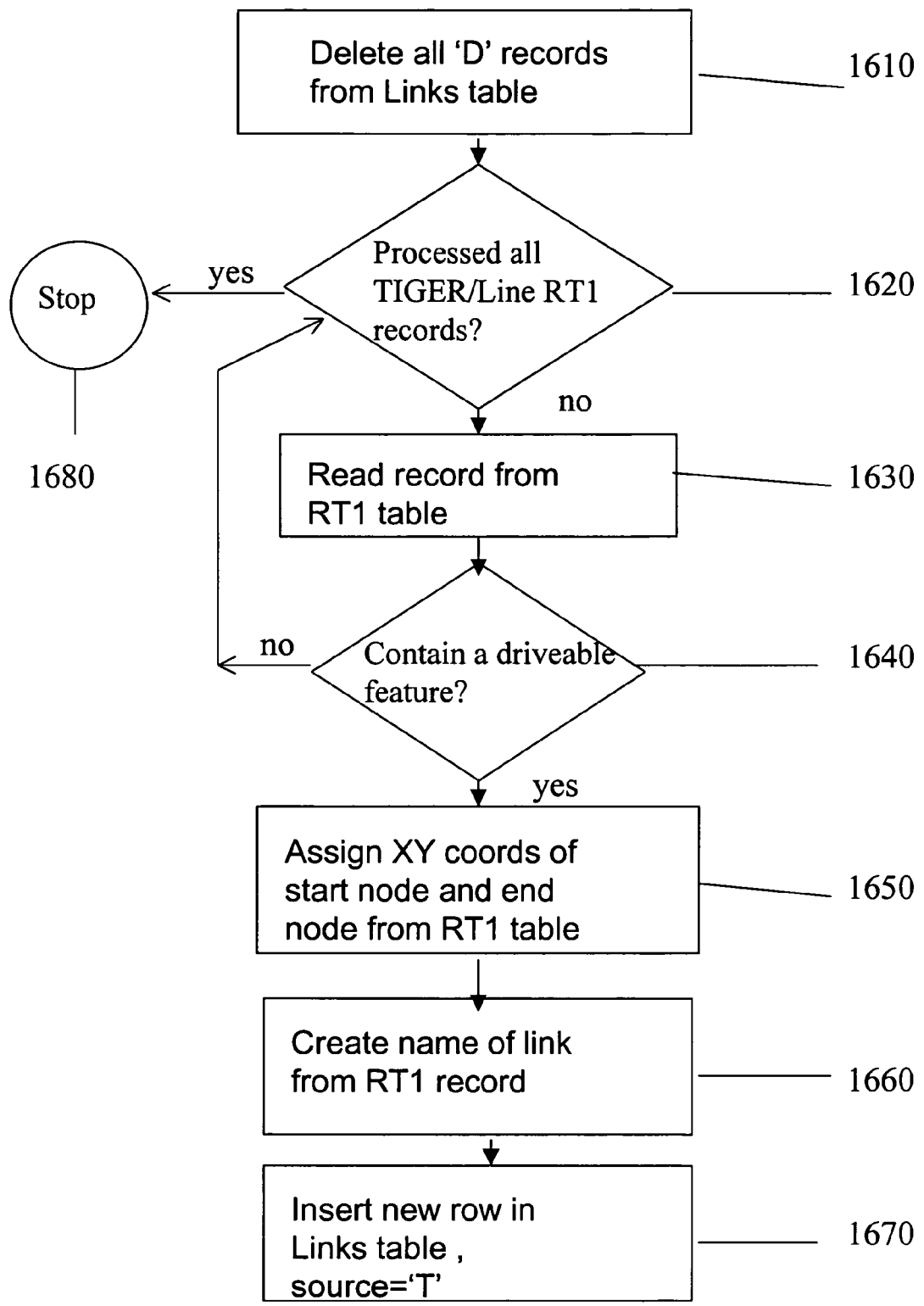
FIG. 16 is a diagram providing additional detail of the algorithm for providing driving directions.

FIGS. 15-18 illustrate the administrative steps of FIG. 2 for driving directions. FIG. 15 gives an overview. At 1500 the 'driving' layer of the node graph is created, as detailed on FIG. 16. A geographical database is read, in one embodiment the TIGER/Line data from the U.S. Census Bureau, specifically the RT1 dataset for the relevant geographical entity served by the invention. At 1610 all 'D' (for 'driving') records are deleted from the Links Table. At 1620 a test is made as to whether all records from the TIGER/Line data have been read. If so, the algorithm stops 1680. If not, a record is read from the database at 1630. At 1640 a test is made as to whether the record contains a drivable feature. (In this step, impossible turns, such as onto a one-way street in the wrong direction, are eliminated.) If not, the algorithm returns to 1620. If the record does contain a driveable feature, the step 1650 is taken, wherein a new Links record is created. The (x,y) coordinates of the record are used to create a start node and end node in the routing graph (detailed below) and saved in the new Links record. A name is also assigned to the link at 1660, preferably using a name from the RT1 record. The new Links record is inserted into the Links table at 1670, with a 'source' column of 'T' to denote that its source is the TIGER/Line data.

Figure 17:
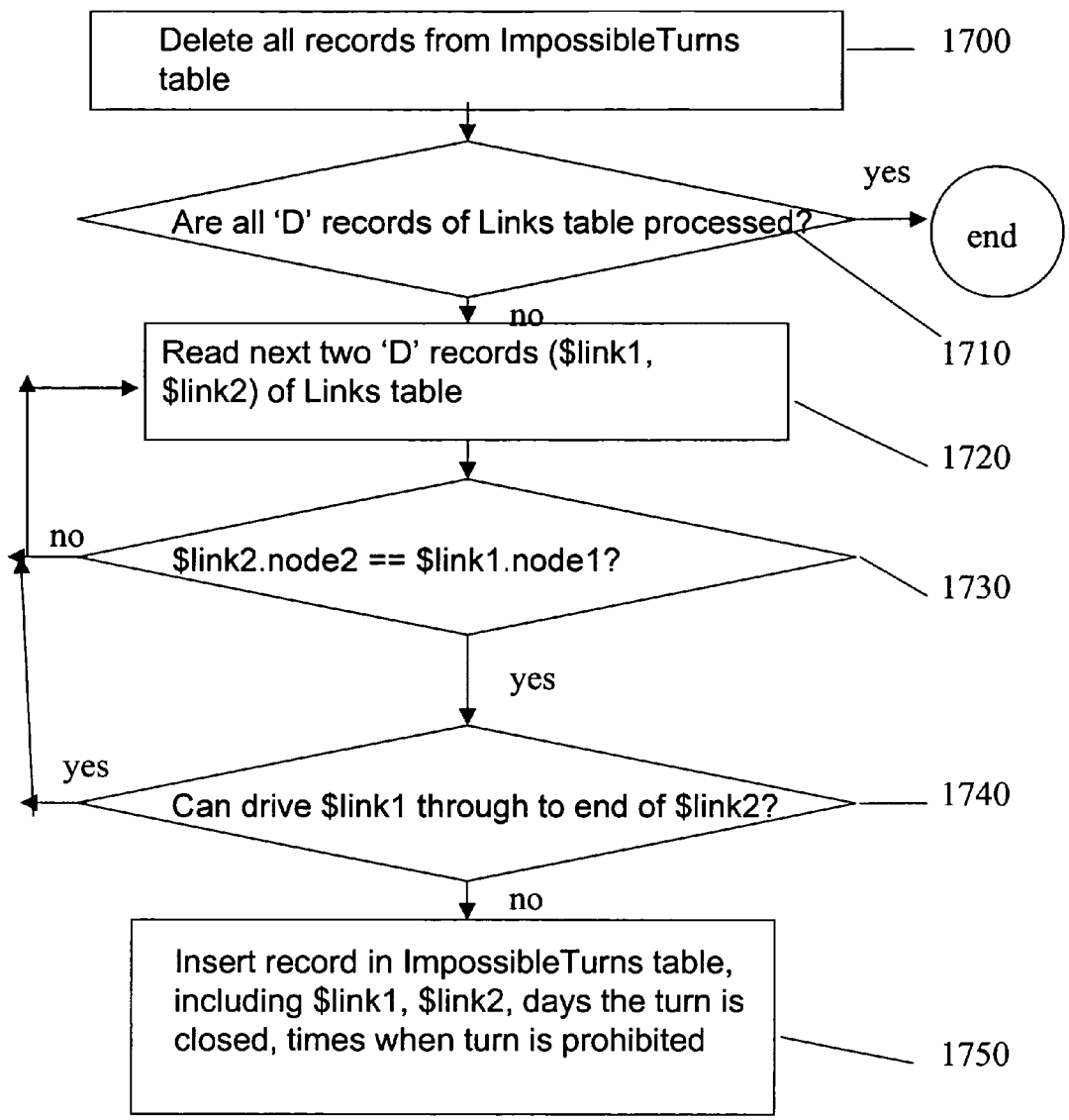
FIG. 17 is a diagram illustrating the creation of the ImpossibleTurns table, a component of the algorithm for providing driving directions.

The algorithm continues at 1510 on FIG. 15, where the ImpossibleTurns table is created, a table giving a list of driving link pairs which are not driveable, either at certain times, on certain days, or at all. 1510 is expanded on FIG. 17. At 1700, all records are deleted. At 1710 a test is made as to whether all 'D' (for 'driving') records of the Links table have been processed. If so, the algorithm terminates. If not, a pair of 'D' records is read 1720. At 1730 a test is made as to whether the pair are "connected", i.e. if the second node of the second link is the same as the first node of the first link. If not, the algorithm returns to 1720. If so, a test is made at 1740 as to whether driving through from link1 to link2 is possible.

(Note that, since the TIGER/Line data from the U.S. Census Bureau does not contain full information on driving conditions such as legal turns, other databases from commercial sources, such as Navteq http://www.navteq.com, are used in some embodiments of the invention.) If so, the algorithm returns to 1720. If not, at 1750 a record is added to the ImpossibleTurns table.

Figure 18:
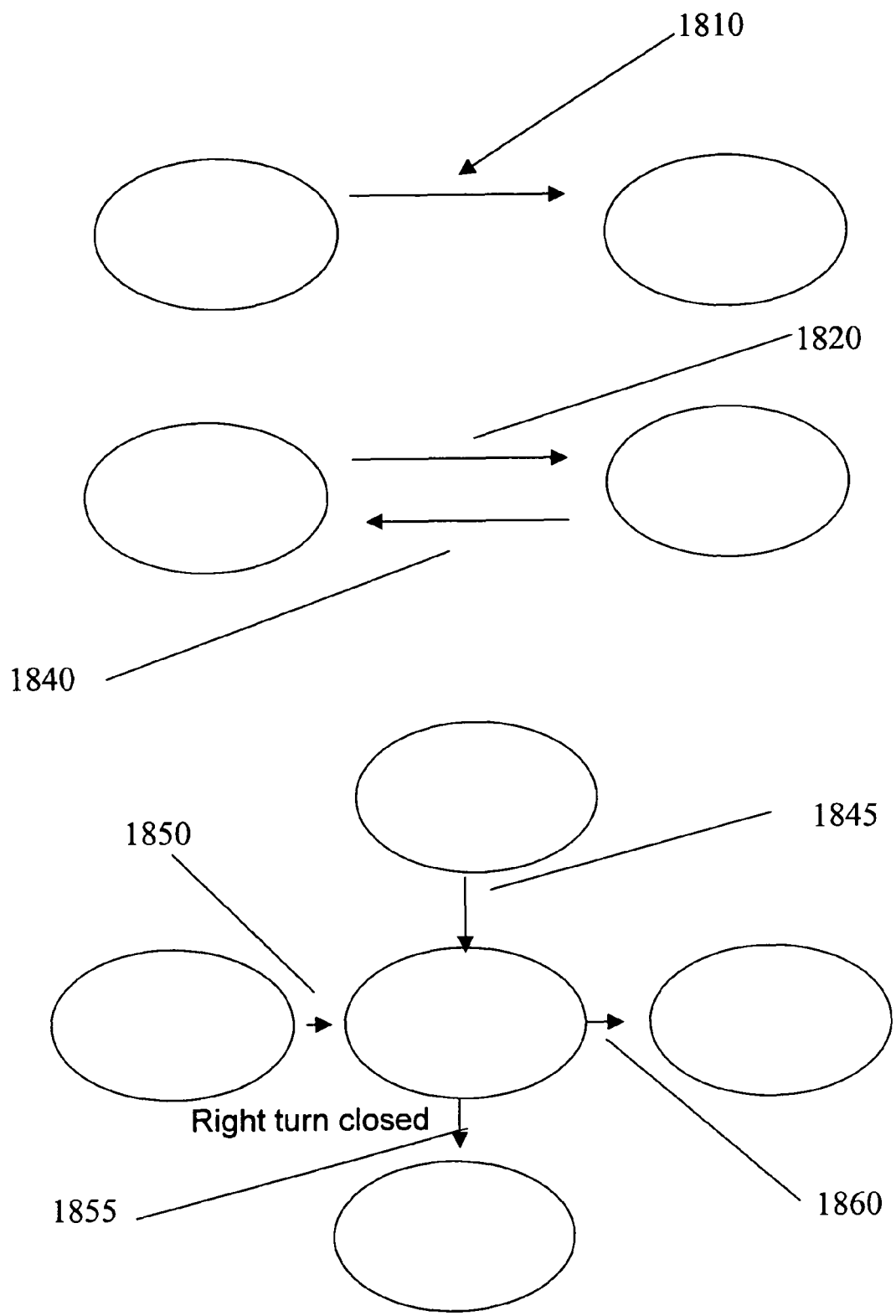
FIG. 18 is a diagram providing additional detail of the creation of the ImpossibleTurns table.

The algorithm continues at 1520 on FIG. 15, which is expanded on FIG. 18. On FIG. 18, the ovals represent nodes and the directed lines represent links. 1810 is a link representing a one-way street, while 1820 and 1840 represent a two-way street. The absence of a link in the opposite direction from 1810 indicates that travel is not possible in that direction. 1845, 1850, 1860, and 1855 also represent one-way links, but additionally an entry in the database for 1855 notes that the right turn is prohibited. The algorithm continues at 1530 on FIG. 15, which represents the normal processing of the route daemon for driving directions. When considering any link for inclusion in driving directions, the daemon checks the previous link in the Links table, and if the pair consisting of the previous link and the link being considered exists as a row in the ImpossibleTurns table, the link is removed from consideration for incorporation into the route.

Figure 19:
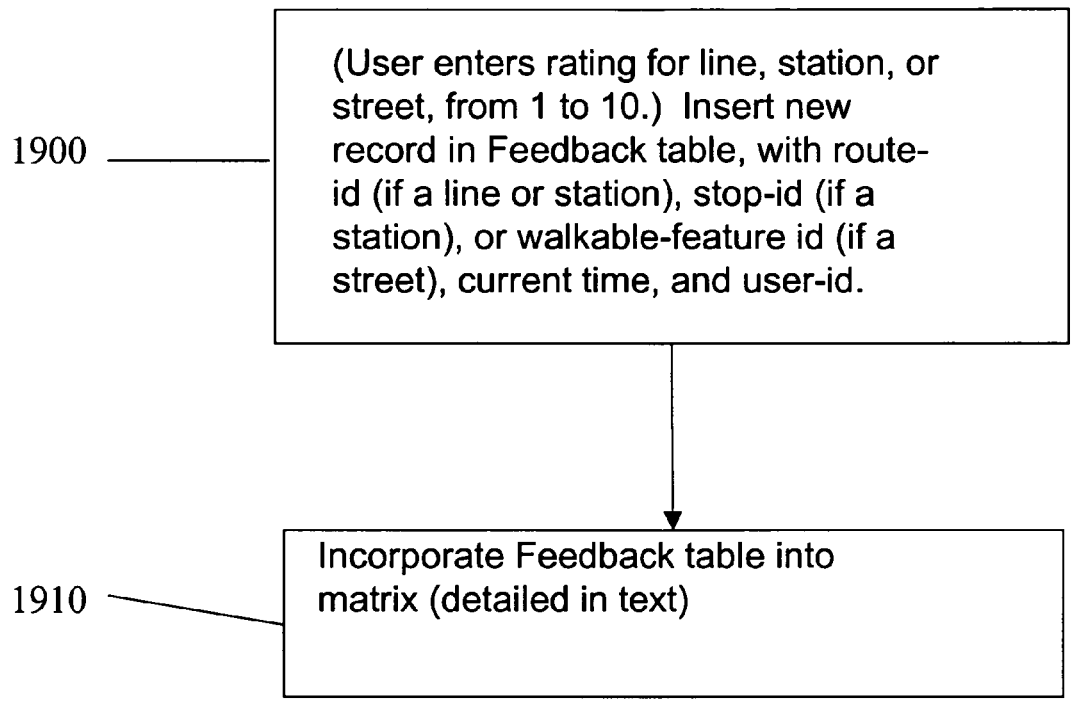
FIG. 19 is a diagram illustrating an overview of the algorithm for incorporating user feedback into routing decisions.

FIGS. 14 and 19 illustrate the mechanism by which user feedback on various aspects of a route is incorporated into subsequent routing decisions. FIG. 14 illustrates a user feedback control, as is invoked by hyperlink 1220. Users rate the subway line or stop on various mass transit criteria, or, in another embodiment, a portion of a walking direction on various walking criteria. In one embodiment, the rating goes from 1 to 10, where 1 is the "best" and 10 is the "worst." The feedback is received from the user by the publisher, using any mechanism known in the art, such as HTTP transaction, XML message, text message (SMS), input from touch-tone phone, voice message, etc. Such feedback is used in the invention as current information to influence routing decisions, in the manner detailed below.

On FIG. 14, a portion of the database schema, 1410, is shown. 1410 describes the Feedback table, data for which is derived from the user interface control 1400. The 'route_id' and 'stop_id' fields pertain to a mass transit line or mass transit stop, respectively, while the 'tlid' field pertains to a portion of a walking route. 'ip' represents user identification information, in this embodiment the IP address from which the feedback was received. It will be apparent to one skilled in the art that other forms of user identification information could also be used, e.g. a unique id of the user as determined by table lookup, telephone number, index into a table of email addresses, personal name, social security number, etc. The 'c_time' field represents the current time of the receipt of the user feedback.

FIG. 19 illustrates the mechanism by which information in the Feedback table is incorporated into routing decisions. At 1900 the record is inserted into the feedback as outlined above. At 1910 the feedback is incorporated, in the following manner:

The Feedback table is searched for lines, stops, or streets having more than 5 Feedback records from different users within the last 6 months. Other parameters for the frequency and recency of the feedback could also be used. In addition, other methods of testing recency could be used, e.g. weighted averages. An average rating is calculated.

If a mass transit route is found with the desired frequency and recency of feedback, all links of the route are "penalized" by having the stored distance of the link multiplied by a factor, in one embodiment, 10 divided by the average rating. A sufficiently large increase will thus tend to bias the routing algorithm away from the mass transit route.

If a mass transit stop is found with the desired frequency and recency of feedback, all links that lead to this stop are "penalized", by having the stored distance of the link multiplied by a factor, in one embodiment, 10 divided by the average rating. A sufficiently large increase will thus tend to bias the routing algorithm away from the mass transit route.

If a portion of a street is found with the desired frequency and recency of feedback, the stored distance of the street portion multiplied by a factor, in one embodiment, 10 divided by the average rating. A sufficiently large increase will thus tend to bias the routing algorithm away from the street portion.

Transaction Model

The foregoing have described an embodiment of the invention which can be delivered over the web to the general public, possibly for free. In another embodiment, the invention can be offered on a subscription or fee basis to transit operators, hotels, travel agents, tourist bureaus whether public or private, corporate trip planners, or any members of the travel industry. The invention can be offered as a Web Service, as defined earlier, with a license key provided in each transaction.

A client wishing to gain access to the invention via the Web Service must enter into a contractual arrangement, possibly through an agent, with the publisher of the Web Service. The publisher might offer a variety of plans, such as a limit on the number of transactions per month, year, or other period, perhaps with "rollover" for unused transactions as in cell phone plans. There could be a per-transaction fee if the client exceeds the limit in any given period. There might also be a fixed fee for unlimited access, or reciprocal arrangements wherein the client performs other services for the operator, such as advertising or contribution to the upkeep of the server installation.

In one embodiment, the web service is described in WSDL, or Web Services Definition Language. In one embodiment, the following nine procedure calls are offered to clients via the Web Service:

1) GetRoute

To get subway and/or bus, and walking directions and maps for a route from address1 to address2. Returns either route info, or preview thumbnails for address1 and address2 if several matches found for the addresses.

2) GetRouteByThumbnailIds

To get a route using thumbnail ids returned by GetRoute.

3) GetRouteInfo

To get info of a route by its id.

4) GetRouteCopy

To get a copy of a route specified by its id. Used to derive a new copy of a route and its maps to prevent changing the original route, and its maps.

5) GetMap

To get a map for an address. Returns either map info, or preview thumbnails if several matches found for the address.

6) GetMapByThumbnailId

To get a map using a thumbnail id returned by GetMap.

7) GetMapInfo

To get info of a map by its id. Accepts parameters to move, zoom, re-center the map if needed.

8) GetMapCopy

To get a copy of a map specified by its id. Used to derive a new copy of a map to prevent changing the original map.

9) GetCityInfo

To get info of a city, including ids/names of its counties, and the default county.

Although the full WSDL is not included here, a representative sample of the XML Schema for the GetRoute protocol is shown below:

```
<s:element name="GetRoute">
  <s:complexType>
    <s:sequence>
      <s:element minOccurs="0" maxOccurs="1"
        name="licenseKey" type="s:string" />
      <s:element minOccurs="0" maxOccurs="1"
        name="city" type="s:string" />
      <s:element minOccurs="0" maxOccurs="1"
        name="county1" type="s:string" />
      <s:element minOccurs="0" maxOccurs="1"
        name="zip1" type="s:string" />
      <s:element minOccurs="0" maxOccurs="1"
        name="address1" type="s:string" />
      <s:element minOccurs="0" maxOccurs="1"
        name="county2" type="s:string" />
      <s:element minOccurs="0" maxOccurs="1"
        name="zip2" type="s:string" />
      <s:element minOccurs="0" maxOccurs="1"
        name="address2" type="s:string" />
      <s:element minOccurs="0" maxOccurs="1"
        name="day" type="s:string" />
      <s:element minOccurs="0" maxOccurs="1"
        name="time" type="s:string" />
      <s:element minOccurs="0" maxOccurs="1"
        name="mode" type="s:string" />
      <s:element minOccurs="0" maxOccurs="1"
        name="transferPriority" type="s:string" />
      <s:element minOccurs="0" maxOccurs="1"
        name="language" type="s:string" />
      <s:element minOccurs="0" maxOccurs="1"
        name="routeId" type="s:string" />
      <s:element minOccurs="0" maxOccurs="1"
        name="simplifiedDirs" type="s:string" />
    </s:sequence>
  </s:complexType>
</s:element>
<s:element name="GetRouteResponse">
  <s:complexType>
    <s:sequence>
      <s:element minOccurs="1" maxOccurs="1"
        name="ResponseStatus" type="s0:ResponseStatus" />
      <s:element minOccurs="0" maxOccurs="1"
        name="RouteInfo" type="s0:RouteData" />
      <s:element minOccurs="0" maxOccurs="1"
        name="Maps" type="s0:ArrayOfMapData" />
      <s:element minOccurs="0" maxOccurs="1"
        name="Thumbnails" type="s0:ArrayOfThumbnailData" />
    </s:sequence>
  </s:complexType>
</s:element>
```

Validation of the license key, including protecting against forgeries or copying or using a license key past its expiration, can be done by any of a variety of schemes known in the art, such as one-way hash functions, public key encryption, shared-secret, etc., or no encryption (clear text)

Mass Transit Database Service

In another embodiment of the invention, a mass transit database such as that depicted in FIG. 1 and in the specification may be offered on a subscription or fee basis to transit operators, hotels, travel agents, tourist bureaus whether public or private, corporate trip planners, or any members of the travel industry.

FIG. 10 displays two screen shots of an embodiment of the invention related to a mass transit database service. 1000 illustrates an interface permitting licensees to view, enter, and edit information on bus and subway routes in New York City. 1010 illustrates a similar interface for mass transit stops in New York City.

Figure 11:
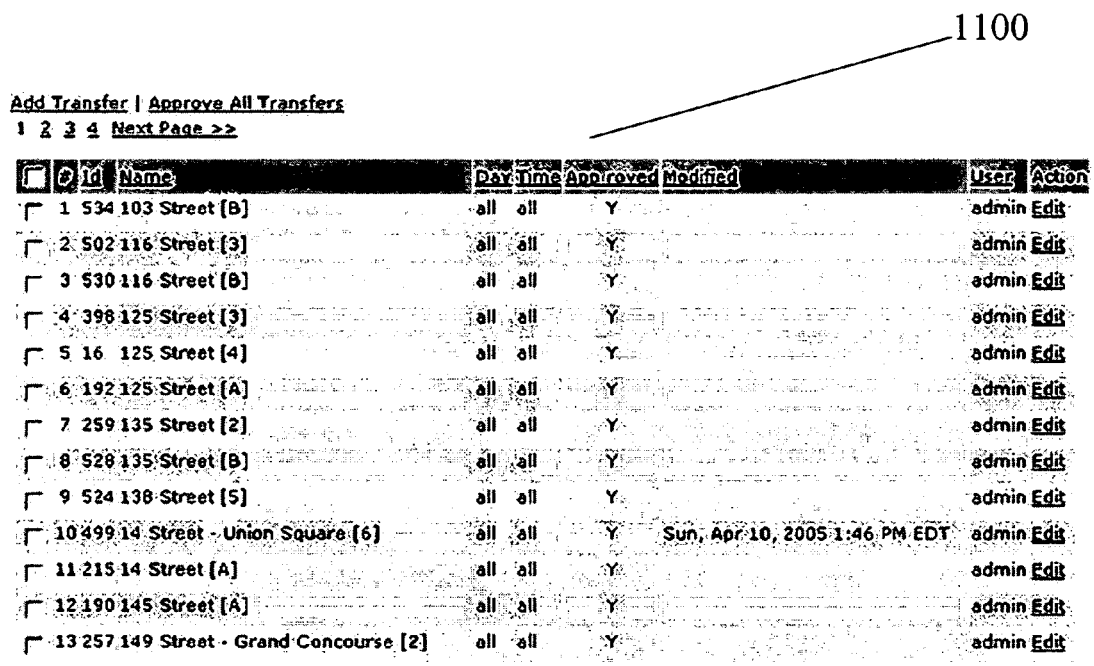
FIG. 11 is a diagram with an additional screen shot of the mass transit database service.

FIG. 11 displays an additional screen of an embodiment of the invention related to a mass transit database service. 1100 illustrates an interface permitting licensees to view, enter, and edit information for mass transit transfers in New York City.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. An apparatus for displaying an integrated multi-modal transportation route, comprising:
   one or more user interface controls for inputting a start point and an end point of a journey, and zero or more intermediate points;
   one or more user interface controls whereby user criteria are set;
   means for displaying one or more walking directions, comprising:
      textual descriptions of the walking directions; and
      graphical depictions of the walking directions;
   means for displaying one or more mass transit directions, comprising:
      textual descriptions of the mass transit directions; and
      graphical depictions of the mass transit directions;
   wherein the walking directions and the mass transit directions, taken together, comprise a complete set of directions from the start point to the end point, passing through the intermediate points; and
   means for receiving user feedback on the quality of the directions.

2. The apparatus of claim 1, wherein the textual descriptions of the mass transit directions comprise:
   one or more mass transit boarding directions; and
   one or more mass transit exiting directions.

3. The apparatus of claim 1, wherein the textual descriptions of the walking directions comprise:
   one or more street names; and
   zero or more turns.

4. The apparatus of claim 1, wherein the user criteria comprise:
   walking criteria, comprising:
      preference for amount of walking; and
   mass transit criteria, comprising:
      preference for maximum number of transfers.

5. The apparatus of claim 1, wherein the graphical depictions of the walking directions comprise:
   graphical display of one or more streets contained in the walking directions;
   graphical display of one or more streets in the neighborhood of the streets contained in the walking directions.

6. The apparatus of claim 1, wherein the means for receiving user feedback on the quality of the directions additionally comprise:
   means for allowing a user to provide feedback on the quality of at least one of textual description of the walking directions and the graphical description of the walking directions.

7. The apparatus of claim 1, wherein the means for receiving user feedback on the quality of the directions additionally comprise:
   means for allowing a user to provide feedback on the quality of the textual description of the mass transit directions and the graphical description of the mass transit directions.

8. The apparatus of claim 1, additionally comprising
   means for displaying driving directions, wherein the driving directions comprise:
      one or more street names; and
      zero or more turns;
   wherein the driving directions are calculated according to a database of one or more impossible turns, wherein the impossible turns are excluded from the driving directions;
   wherein the walking directions and the mass transit directions and the driving directions, taken together, comprise a complete set of directions from the start point to the end point, passing through the intermediate points.

9. The apparatus of claim 6 further comprising:
   means for creating and maintaining a database about the user's own preferences, for creating routes for that user;
   means for updating the database used for all users; and
   means for incorporating user-provided feedback on various aspects of a route into subsequent routing decisions.

10. The apparatus of claim 7 further comprising:
    means for creating and maintaining a database about the user's own preferences, for creating routes for that user;
    means for updating the database used for all users; and
    means for incorporating user-provided feedback on various aspects of a route into subsequent routing decisions.

11. The apparatus of claim 1 further comprising means for optimizing the directions according to the user input.

12. The apparatus of claim 1 further comprising means for optimizing the directions according to at least one of a single or plurality of records in a database representing user-provided feedback.

13. The apparatus of claim 1 comprising:
    means for computing directions between a set of points, which means further comprise:
    means for accepting user input for a trip in the form of two or more points, comprising a start point, an end point, and zero or more intermediate points;
    means for computing one or more directions between the start point and the end point, the directions comprising:
       one or more mass transit directions;
       one or more walking directions; and
    means for optimizing the directions according to one or more criteria.

14. The apparatus of claim 13 further comprising means for seeking optimal transit routes over a network of nodes in response to user input.

15. The apparatus of claim 14 further comprising means for connecting nodes closest to each other, from the start node to the end node, in finding an optimal transit route.

16. The apparatus of claim 13 further comprising means for storing and transforming transit data in a transit route search.

17. The apparatus of claim 13 further comprising means for implementing one or more of transit-route search utilities for an end user.

18. An apparatus for displaying an integrated multi-modal transportation route, comprising:
    one or more user interface controls for inputting a start point and an end point of a journey, and zero or more intermediate points;
    one or more user interface controls whereby user criteria are set;
    means for displaying one or more walking directions, comprising:

textual descriptions of the walking directions; and
graphical depictions of the walking directions;
means for displaying one or more mass transit directions, comprising:
textual descriptions of the mass transit directions; and
graphical depictions of the mass transit directions;
wherein the walking directions and the mass transit directions, taken together, comprise a complete set of directions from the start point to the end point, passing through the intermediate points;
wherein the apparatus comprises at least one of an internet enabled computer, a personal digital assistant, a cell phone, a landline phone, and a laptop computer; and
means for receiving user feedback on the quality of the directions.

19. In an apparatus for displaying an integrated multi-modal transportation route, a method for calculating and displaying an integrated multi-modal transportation route, comprising:
inputting a start point and an end point of a journey, and inputting zero or more intermediate points;
inputting user criteria;
displaying one or more walking directions, comprising:
displaying textual descriptions of the walking directions; and
displaying graphical depictions of the walking directions;
displaying one or more mass transit directions, comprising:
displaying textual descriptions of the mass transit directions; and
displaying graphical depictions of the mass transit directions;
wherein the walking directions and the mass transit directions, taken together, comprise a complete set of directions from the start point to the end point, passing through the intermediate points.

20. The method of claim 19, additionally comprising the steps of:
receiving user feedback on one or more directions, the user feedback comprising:
one or more numerical ratings of quality of the directions;
adding the user feedback to a database;
wherein the directions are additionally optimized according to the user feedback.

21. The method of claim 19, wherein the directions additionally comprise:
driving directions, wherein the driving directions comprise:
one or more street names; and
zero or more turns;
wherein the driving directions are calculated according to a database of one or more impossible turns, wherein the impossible turns are excluded from the driving directions.

22. The method of claim 19 further comprising:
providing directions via a web service, comprising performing transactions providing directions for a trip, wherein the transactions further comprise:
a request from a client to a publisher;
user input comprising a date and time of a trip;
a computation, comprising computing one or more directions wherein the directions provide a route between a start point and an end point; and
wherein the directions are optimized according to the user input.

23. The method of claim 19 comprising processing a user request for directions which further comprises:
validating a user request by a web services client;
sending a request to a web service;
looking up a route id from start and destination addresses respectively when the route id has not been supplied by a user;
retrieving route information from the database when a route id has been supplied by a user;
validating start and destination addresses;
looking up validated start and destination addresses in a directed graph, and finding node numbers for the start and destination addresses; and
calculating an optimal route.

* * * * *